US012338678B2

(12) United States Patent
Ohrstrom et al.

(10) Patent No.: US 12,338,678 B2
(45) Date of Patent: Jun. 24, 2025

(54) WINDOW ASSEMBLY FOR MITIGATING FLUID INGRESS

(71) Applicant: VISION EXTRUSIONS GROUP LIMITED, Woodbridge (CA)

(72) Inventors: Rolf Ohrstrom, Woodbridge (CA); Don Feil, Woodbridge (CA)

(73) Assignee: VISION EXTRUSIONS GROUP LIMITED, Woodbridge (CA)

( * ) Notice: Subject to any disclaimer, the term of this patent is extended or adjusted under 35 U.S.C. 154(b) by 0 days.

(21) Appl. No.: 17/152,713

(22) Filed: Jan. 19, 2021

(65) Prior Publication Data

US 2021/0222480 A1 Jul. 22, 2021

Related U.S. Application Data

(60) Provisional application No. 62/962,596, filed on Jan. 17, 2020.

(51) Int. Cl.

*E06B 3/263* (2006.01)
*E06B 3/06* (2006.01)
*E06B 3/663* (2006.01)

(52) U.S. Cl.

CPC ............ *E06B 3/66342* (2013.01); *E06B 3/06* (2013.01); *E06B 3/26303* (2013.01)

(58) Field of Classification Search

CPC ............ E06B 1/30; E06B 1/6007; E06B 3/06; E06B 3/26; E06B 3/2605; E06B 3/26301; E06B 3/26303; E06B 3/66342; E06B 3/26327; E06B 2003/224; E06B 2003/26389; E06B 2003/6247; E06B 7/16;

(Continued)

(56) References Cited

U.S. PATENT DOCUMENTS 2,872,713 A * 2/1959 Haas .................. E06B 3/26301 52/172
3,090,083 A * 5/1963 Emmerich .............. E06B 3/223 52/204.597

(Continued)

FOREIGN PATENT DOCUMENTS

GB 2371074 A * 7/2002 ............. E06B 1/366

*Primary Examiner* — Kyle J. Walraed-Sullivan
(74) *Attorney, Agent, or Firm* — MARSHALL, GERSTEIN & BORUN LLP

(57) ABSTRACT

A window assembly for mitigating fluid ingress between adjacent frame members is disclosed. The assembly has a first frame member of a first frame, and a second frame member of a second frame. The first frame member includes a seal-receiving channel first counterpart, and the second frame member includes a seal-receiving channel second counterpart. The first and second frame members are co-operatively configured such that, while the first counterpart of the seal-receiving channel is disposed opposite to the second counterpart of the seal-receiving channel, the seal-receiving channel is defined. The sealing interface is defined while the seal is disposed in the seal-receiving channel, and while the first and second frame members are disposed in a sealing interface-defining proximity. While the sealing interface is defined between the first and second frame members, the sealing interface resists fluid communication or fluid ingress between the first and second frame members.

38 Claims, 13 Drawing Sheets

(58) Field of Classification Search
CPC ...... E06B 3/362; E06B 3/26305; E06B 3/365; E06B 2003/26367; E06B 2003/26379; E06B 2003/26381
See application file for complete search history.

(56) References Cited

U.S. PATENT DOCUMENTS 3,430,384 A * 3/1969 Yves .......... E06B 7/14 49/495.1
3,703,063 A * 11/1972 Budich .......... E06B 3/60 49/504
3,729,869 A * 5/1973 Wenig .......... E06B 3/16 52/843
3,861,085 A * 1/1975 Jacob .......... E06B 3/308 49/501
4,204,369 A * 5/1980 Hubbard .......... E05B 65/1066 49/366
4,283,882 A * 8/1981 Hubbard .......... E05C 7/04 49/141
4,370,827 A * 2/1983 Furuminato .......... E06B 7/2307 49/368
4,471,589 A * 9/1984 Schmidlin .......... E06B 3/66366 52/171.3
4,488,378 A * 12/1984 Symon .......... E05B 65/1066 49/141
4,524,112 A * 6/1985 Willert .......... E06B 3/273 428/595
4,563,848 A * 1/1986 Gartner .......... E04B 1/74 52/235
4,599,838 A * 7/1986 Kaminaga .......... E04B 2/90 52/204.591
4,614,062 A * 9/1986 Sperr .......... E06B 3/26303 49/401
4,625,482 A * 12/1986 Kaminaga .......... E04B 2/96 52/235
4,856,239 A * 8/1989 Elsasser .......... E06B 1/30 52/98
4,934,115 A * 6/1990 Nozaki .......... E04B 2/745 160/235
5,133,108 A * 7/1992 Esnault .......... E05D 15/242 16/225
5,373,671 A * 12/1994 Roth .......... E06B 3/263 52/204.1
5,596,851 A * 1/1997 Ting .......... E06B 1/62 52/211
5,749,175 A * 5/1998 Koike .......... E06B 7/22 49/366
5,768,836 A * 6/1998 Bachmann .......... E06B 1/325 49/504
5,930,955 A * 8/1999 Biebuyck .......... E06B 3/362 49/366
6,393,765 B1 * 5/2002 Goldstein .......... B63B 19/26 49/489.1
6,393,778 B1 * 5/2002 Ting .......... E06B 3/4609 52/204.5
6,662,512 B2 * 12/2003 Westphal .......... E06B 1/6007 52/204.1
8,001,738 B2 * 8/2011 Ting .......... E04B 2/90 52/235
8,191,325 B2 * 6/2012 Ting .......... E04B 2/96 52/235
10,227,817 B2 * 3/2019 Ting .......... E06B 3/5427
2004/0255529 A1 * 12/2004 Pielmeier .......... E06B 1/30 52/212
2006/0000146 A1 * 1/2006 Heads .......... E06B 1/366 49/408
2008/0086961 A1 * 4/2008 Westermann .......... E06B 3/221 52/204.593
2010/0018140 A1 * 1/2010 Brunnhofer .......... E06B 3/26303 52/204.71
2010/0293881 A1 * 11/2010 Betz .......... E06B 3/308 52/656.2
2011/0011006 A1 * 1/2011 Wuest .......... E06B 3/221 49/506
2012/0240492 A1 * 9/2012 Woodward .......... E06B 1/363 52/204.5
2013/0291459 A1 * 11/2013 Frey .......... E06B 3/5409 52/656.5
2014/0298740 A1 * 10/2014 Ting .......... B32B 17/10055 52/302.1
2015/0252611 A1 * 9/2015 Ye .......... E06B 3/24 52/204.593
2017/0074029 A1 * 3/2017 Fetting .......... B29C 48/15
2018/0179805 A1 * 6/2018 Niehausmeier .......... E06B 3/26305
2018/0347257 A1 * 12/2018 Lambertini .......... E06B 3/025
2019/0055773 A1 * 2/2019 Brandes .......... E06B 5/16
2019/0264491 A1 * 8/2019 McKenna .......... E06B 3/26
2020/0040640 A1 * 2/2020 Fumagalli .......... E06B 3/26303
2020/0082240 A1 * 3/2020 Heitmar .......... E06B 1/30
2020/0109595 A1 * 4/2020 Woodward .......... E06B 3/306
2020/0199932 A1 * 6/2020 Jones .......... E06B 1/02
2020/0208462 A1 * 7/2020 Mastrogiannis .......... E05D 13/1207
2020/0318422 A1 * 10/2020 Koster .......... E06B 7/23

* cited by examiner

WINDOW ASSEMBLY FOR MITIGATING FLUID INGRESS

CROSS-REFERENCE TO RELATED APPLICATION

This application claims the benefits of priority to U.S. Provisional Patent Application No. 62/962,596, filed Jan. 17, 2020, titled WINDOW ASSEMBLY FOR MITIGATING FLUID INGRESS, the contents of which are hereby expressly incorporated into the present application by reference in their entirety.

FIELD

The present disclosure relates to a window assembly, in particular, to a window assembly for mitigating fluid ingress between frame members.

BACKGROUND

There are a number of different styles of windows, including tilt and turn windows, casement windows, awning windows, and single and double hung windows. Windows typically include a frame, and one or more window panes that are received in the frame, with the frame members of the frame surrounding the panes. The frame may define a drainage channel, such that condensation may be collected and drained out of the window. The frame may also define one or more channels to receive a glass stop, which is configured to support the pane. The frame may also include a seal, which, while the pane is received in the frame, is co-operatively configured with the pane to define a sealing interface such that fluid communication through the frame is resisted or absent.

Windows may be installed in a room in order to, for example, introduce light into the room, or to provide a line of sight between the inside of the room and the outside of the room. It may be desirable to install two or more windows adjacent to each other to increase the amount of light that may enter into the room, or to increase the line of sight. The windows may be installed next to each other, or above one another.

One way to install the windows adjacent to each other is by connecting a frame member of one window frame to a frame member of an adjacent window frame. Various connection systems have been developed to connect the frame members, such as, for example, adhesive or double-sided tape. Unfortunately, existing connection systems do not provide a reliable connection between the frame members, such that the frame members, and thus the window frames, may be susceptible to separation. In addition, the connection between the frame members may not resist fluid communication through the space between the frame members. Moreover, the connection may define a region of relatively poor insulation for the room in which the windows are installed, such that relatively warm air from the room may exit to the outside through the region, or relatively warm air from the outside may enter the room through the region. This may require the room to be excessively heated or cooled in order to maintain a desired temperature. Debris or liquid may also enter the room from the outside through the connection between the frame members, or may collect between the frame members. Additionally, design and cost limitations of the existing connection systems disincentive the manufacturing of larger window frames.

SUMMARY

In one aspect, there is provided a kit for a window assembly, comprising: a first frame member that includes: a seal-receiving channel first counterpart; an exterior wall; an interior wall that is disposed on an opposite side of the first frame member relative to the exterior wall; and a pane-receiving space, defined by the interior wall, that is configured to receive a glass pane; a second frame member that includes: a seal-receiving channel second counterpart; an exterior wall; an interior wall that is disposed on an opposite side of the second frame member relative to the exterior wall; and a pane-receiving space, defined by the interior wall, that is configured to receive a glass pane; wherein: the first and second frame members are co-operatively configured such that, while the exterior wall of the first frame member is disposed opposite to the exterior wall of the second frame member, a seal receiving channel is defined by at least the first and second counterparts; and the seal-receiving channel is configured for disposition of a seal therein.

In another aspect, there is provided a kit for a window assembly, comprising: a first frame member that includes: a seal-receiving channel first counterpart; an exterior wall; an interior wall that is disposed on an opposite side of the first frame member relative to the exterior wall; and a glass stop-receiving channel, defined by the interior wall, that is configured to receive a glass stop; a second frame member that includes: a seal-receiving channel second counterpart; an exterior wall; an interior wall that is disposed on an opposite side of the second frame member relative to the exterior wall; and a glass stop-receiving channel, defined by the interior wall, that is configured to receive a glass stop; wherein: the first and second frame members are co-operatively configured such that, while the exterior wall of the first frame member is disposed opposite to the exterior wall of the second frame member, the seal receiving channel is defined by at least the first and second counterparts; and the seal-receiving channel is configured for disposition of a seal disposed therein.

In another aspect, there is provided a window assembly, comprising: a first frame member that includes: a seal-receiving channel first counterpart; an exterior wall; an interior wall that is disposed on an opposite side of the first frame member relative to the exterior wall; and a pane-receiving space, defined by the interior wall, that is configured to receive a glass pane; a second frame member that includes: a seal-receiving channel second counterpart; an exterior wall; an interior wall that is disposed on an opposite side of the second frame member relative to the exterior wall; and a pane-receiving space, defined by the interior wall, that is configured to receive a glass pane; wherein the first and second frame members are co-operatively configured such that, while the exterior wall of the first frame member is disposed opposite to the exterior wall of the second frame member, a seal receiving channel is defined by at least the first and second counterparts; and a seal that is disposed in the seal receiving channel.

In another aspect, there is provided a window assembly, comprising: a first frame member that includes: a seal receiving channel first counterpart; an exterior wall; an interior wall that is disposed on an opposite side of the first frame member relative to the exterior wall; and a glass stop-receiving channel, defined by the interior wall, that is configured to receive a glass stop; a second frame member that includes: a seal receiving channel first counterpart; an exterior wall; an interior wall that is disposed on an opposite side of the second frame member relative to the exterior wall; and a glass stop-receiving channel, defined by the interior wall, that is configured to receive a glass stop; wherein the first and second frame members are co-operatively configured such that, while the exterior wall of the first frame member is disposed opposite to the exterior wall of the second frame member, the seal receiving channel is defined by at least the first and second counterparts; and a seal that is disposed in the seal receiving channel.

In another aspect, there is provided a frame member, comprising: a seal-receiving channel counterpart that is configured to be disposed in opposition to a seal-receiving channel counterpart of an adjacent frame member, the seal-receiving channel configured for disposition a seal disposed therein; wherein, while the seal-receiving channel counterpart is disposed in opposition to the seal-receiving channel counterpart of the adjacent frame member, a seal-receiving channel is defined by at least the seal receiving channel counterpart of the frame member and the seal receiving channel counterpart of the adjacent frame member.

Other aspects will be apparent from the description and drawings provided herein.

BRIEF DESCRIPTION OF DRAWINGS

In the figures, which illustrate example embodiments.

DETAILED DESCRIPTION

A window assembly for mitigating fluid ingress between adjacent window frame members is disclosed. The window assembly has a first frame member of a first window frame, and a second frame member of a second window frame. The first and second frame members may be moulded, such as blow moulded or injection moulded, or may be extruded. The first frame member includes a seal-receiving channel first counterpart, and the second frame member includes a seal-receiving channel second counterpart. The seal-receiving channel is configured to have a seal disposed therein. The first frame member and the second frame member are co-operatively configured such that, while the first counterpart of the seal-receiving channel is disposed opposite to the second counterpart of the seal-receiving channel, the seal-receiving channel is defined. The sealing interface is defined while the seal is disposed in the seal-receiving channel, and while the first frame member and the second frame member are disposed in a sealing interface-defining proximity. While the sealing interface is defined between the first and second frame members, the sealing interface resists fluid communication or fluid ingress between the first and second frame members. In this regard, the window assembly may promote insulation of the room in which the window assembly is installed via the sealing interface defined between the first window frame and the second window frame, and collection of debris between the first and second window frames may be resisted. In addition, window assemblies of various sizes and configurations may be manufactured.

Figure 13:
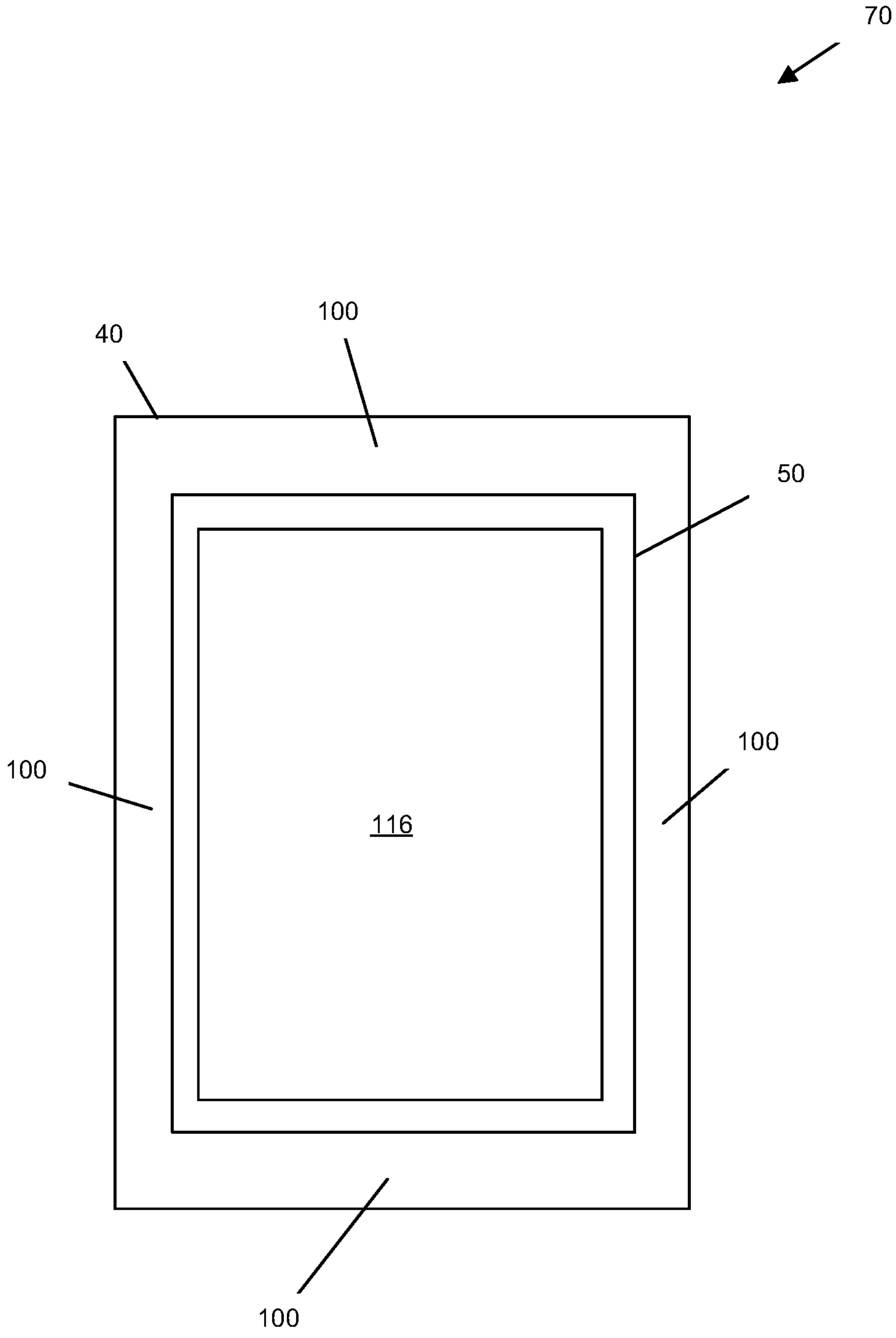
FIG. 13 is a schematic of a window with a window frame that includes the frame member of FIG. 1.

FIG. 13 depicts a window 70. In some embodiments, for example, the window 70 includes a frame 40, a sash 50, and one or more glass panes 116. In some embodiments, for example, the window frame 40 includes one or more frame members 100 that are co-operatively configured to define the window frame 40. As depicted, the glass pane 116 is disposed in the sash 50, and the sash 50 is disposed in the window frame 40. In some embodiments, for example, the frame 40 supports the sash 50, which supports the glass pane 116.

Figure 1:
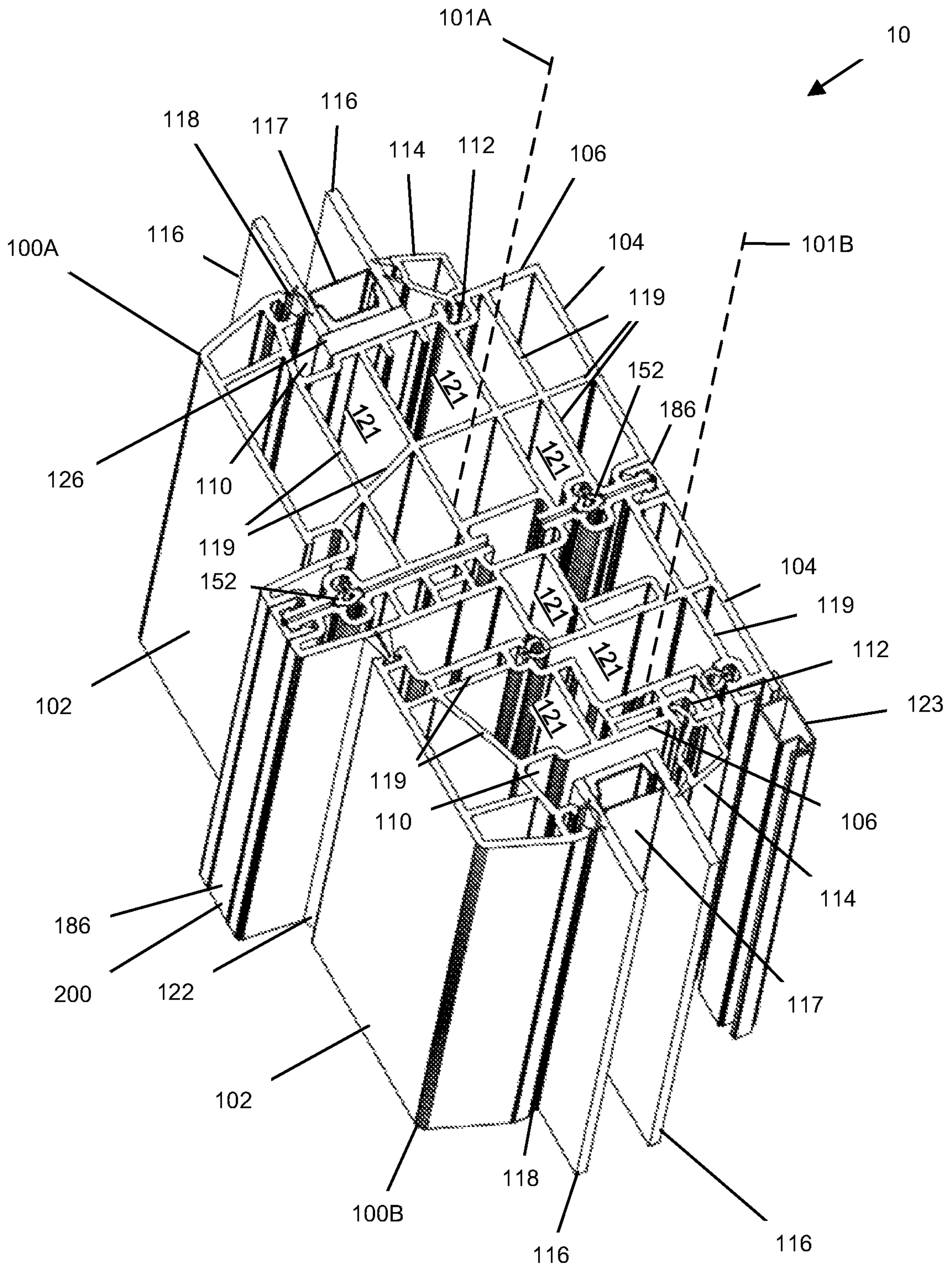
FIG. 1 is a perspective view of a window assembly.

FIG. 1 depicts an example window assembly 10. The window assembly 10 comprises one or more frame members 100. As depicted in FIG. 1, the window assembly 10 comprises a first frame member 100A and a second frame member 100B. The first frame member 100A is a frame member of a first window frame, and the second frame member 100B is a frame member of a second window frame. In some embodiments, for example, the first frame member 100A and the second frame member 100B are manufactured by extrusion, blow moulding, or injection moulding. In some embodiments, for example, the first frame member 100A and the second frame member 100B are extruded lineals.

Figure 2:
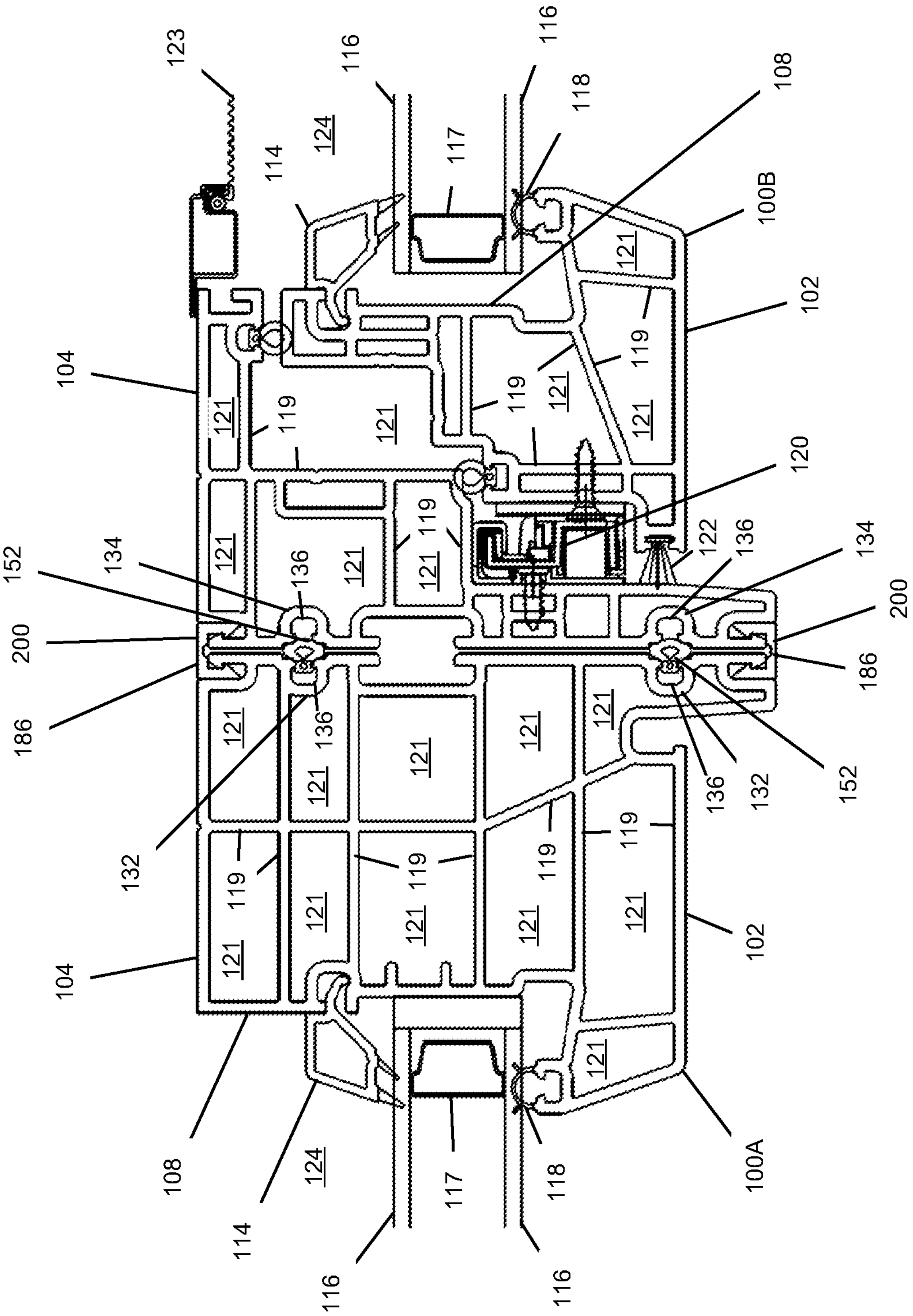
FIG. 2 is a top view of the window assembly of FIG. 1.
Figure 3:
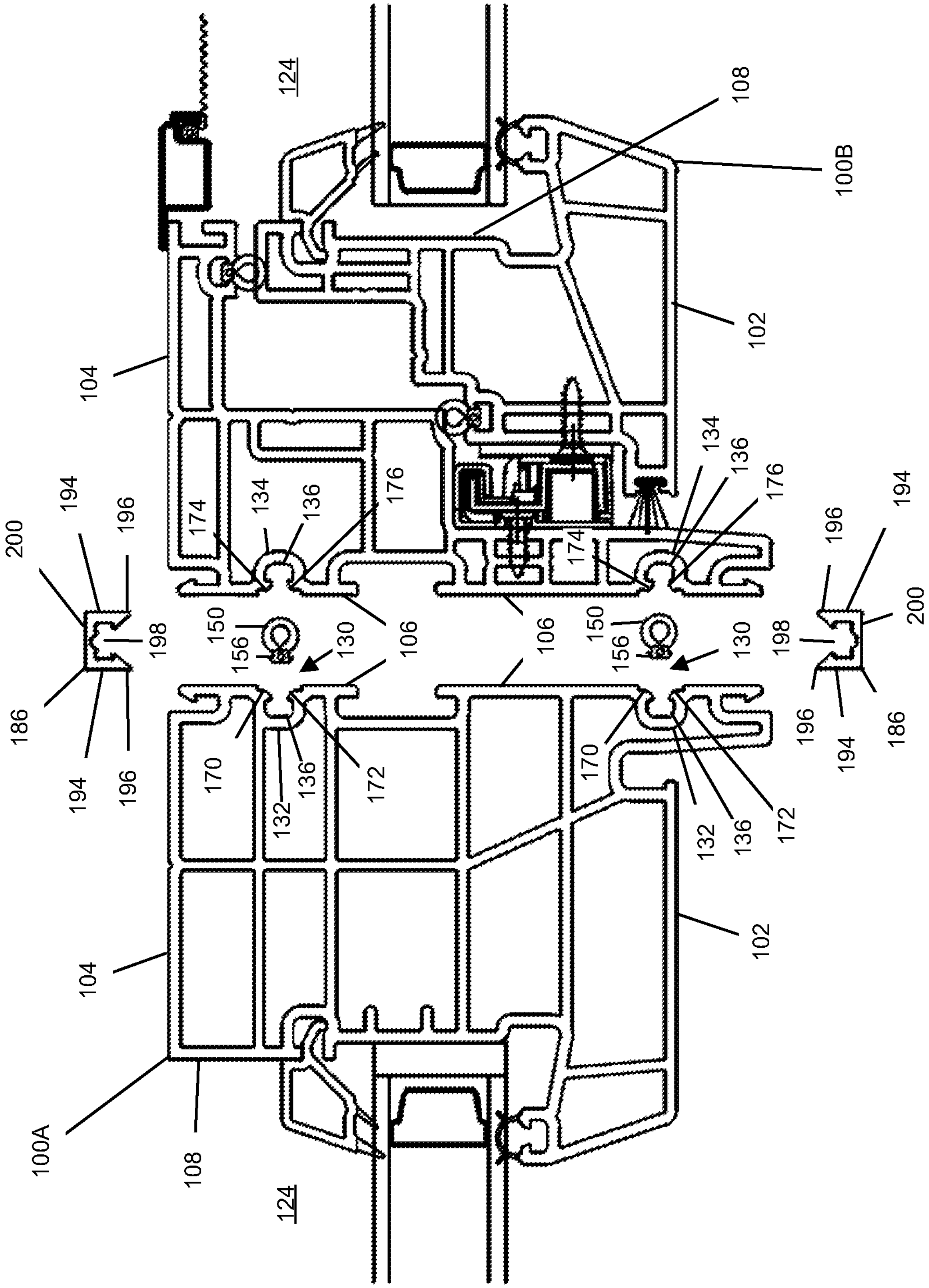
FIG. 3 is a top exploded view of the window assembly of FIG. 1.

The first frame member 100A and the second frame member 100B comprise an external wall 102, an internal wall 104, an exterior wall 106, and an interior wall 108. As depicted in FIG. 1, FIG. 2, and FIG. 3, in some embodiments, for example, the internal wall 104 is disposed on an opposite side of the frame member 100 relative to the external wall 102, and the interior wall 108 is disposed on an opposite side of the frame member 100 relative to the exterior wall 106. In some embodiments, for example, while the frame member 100 is installed, for example, in a wall of a room, the external wall 102 is facing the outside of the room, the internal wall 104 is facing the inside of the room, the exterior wall 106 is facing away from a pane-receiving space 124 defined by the frame for receiving the window glass pane, and the interior wall 108 is facing the pane-receiving space 124 defined by the frame for receiving the window glass pane. In some embodiments, for example, while the frame member 100 is installed, for example, in a wall of a room, the external wall 102 and the internal wall 104 are visible, while the exterior wall 106 and the interior wall 108 are obscured from view, for example, by surrounding drywall or other construction materials.

As depicted in FIG. 1, in some embodiments, for example, the frame member 100 includes a drainage channel 110 and a glass stop-receiving channel 112. The drainage channel 110 is configured to receive and drain condensation or fluid that has collected in the window, and the glass stop-receiving channel 112 is configured to receive a glass stop 114 that supports one or more glass panes 116 in the frame. In some embodiments, for example, the frame, having the frame member 100, is configured to support one or more glass panes 116. As depicted in FIG. 1, the frame is supporting two glass panes 116 that are separated by a spacer 117. As depicted in FIG. 1, in some embodiments, for example, the drainage channel 110 and the glass stop-receiving channel 112 are defined by the interior wall 108 of the frame member 100.

In some embodiments, for example, the frame member 100 includes a seal or flex 118 that is co-operatively configured with the pane 116 to define a sealing interface between the frame member 100 and the pane 116. As depicted in FIG. 1 and FIG. 2, the flex 118 is connected to the frame member 100 and facing towards the glass stop-receiving channel 112 and towards the pane-receiving space 124. In some embodiments, for example, where the frame member 100 is an extruded lineal, the seal or flex 118 may be co-extruded with the frame member 100.

In some embodiments, for example, the frame member 100 includes one or more supporting ribs 119. In some embodiment, for example, the supporting rib 119 extends along the length of the frame member 100. As depicted in FIG. 1 and FIG. 2, in some embodiments, for example, the supporting rib 119 extends between one of the external wall 102, the internal wall 104, the exterior wall 106, and the interior wall 108, and another of the walls. As depicted in FIG. 1, the external wall 102, the internal wall 104, the exterior wall 106, the interior wall 108, and the supporting rib 119, or intersecting supporting ribs 119, define a channel 121 in the frame member 100. In some embodiments, for example, then channel 121 extends along the length of the frame member 100.

In some embodiments, for example, as depicted in FIG. 2, the frame member 100 includes a hinge 120 that is configured to pivot a moveable portion of the frame member relative to a stationary portion of the frame member 100. In this regard, in some embodiments, for example, the moveable portion of the frame member 100 includes the pane 116, and the stationary portion of the frame member 100 does not include the pane 116. While the moveable portion is moved relative to the stationary portion, the pane 116 also moves relative to the stationary portion. The moveable portion of the frame member 100 is moveable between an open position and a close position. While the moveable portion of the frame member is in the closed position, the pane 116 is disposed relative to the frame such that fluid communication through the frame is resisted by the pane 116 or absent. While the moveable portion of the frame member 100 is in the open position, the pane 116 is disposed relative to the frame such that fluid communication through the frame is present. As depicted in FIG. 2, in some embodiments, for example, the hinge 120 is disposed in one of the internal channels 121 of the frame member 100. In some embodiments, for example, as depicted in FIG. 2, the frame member 100B has a hinge 120, while the frame member 100A does not have a hinge 120. In this regard, in some embodiments, for example, the frame member 100B is the operable frame member, and the frame member 100A is the fixed frame member.

In some embodiments, for example, as depicted in FIG. 1 and FIG. 2, the frame member 100 includes weather stripping 122 to define a seal between portions of the frame member 100, for example, to prevent or mitigate incursion of debris or fluid into the frame member 100.

In some embodiments, for example, the frame member 100 includes a screen 123. In some embodiments, for example, as depicted in FIG. 1 and FIG. 2, one of the frame members 100, such as the frame member 100B, of the window assembly 10 includes the screen 123, and the screen 123 is offset relative to the panes 116. The screen 123 is configured to filter debris while fluid communication is permitted through the window, for example, while the moveable portion of the frame member 100 is in the open position.

In some embodiments, for example, as depicted in FIGS. 1 to 3, the interior wall 108 defines a pane-receiving space 124. The pane-receiving space 124 is configured to receive the glass pane 116. In some embodiments, for example, the pane-receiving space 124 is configured to receive a sitting block 126. While the one or more panes 116 is received in the frame, such as in the pane-receiving space 124, and supported by the glass stop 114, the sitting block 126 is interposed between the panes 116 and the drainage channel 110 such that the panes 116 are offset from the drainage channel 110. While the pane 116 is received in the window frame, for example, in the pane receiving space 124, the pane 116 may be connected to the frame member 100 using, for example, an adhesive, such as glue, or double-sided tape.

As depicted in FIGS. 1 to 3, the window assembly 10 includes the first frame member 100A and the second frame member 100B. In some embodiments, for example, as depicted in FIG. 3, the first frame member 100A includes a seal-receiving channel first counterpart 132, and the second frame member 100B includes a seal-receiving channel second counterpart 134. The seal-receiving channel 130 is configured for disposition of a seal 150 therein. FIGS. 1 to 5 depict the seal 150 disposed in the seal-receiving channel 130.

Figure 5:
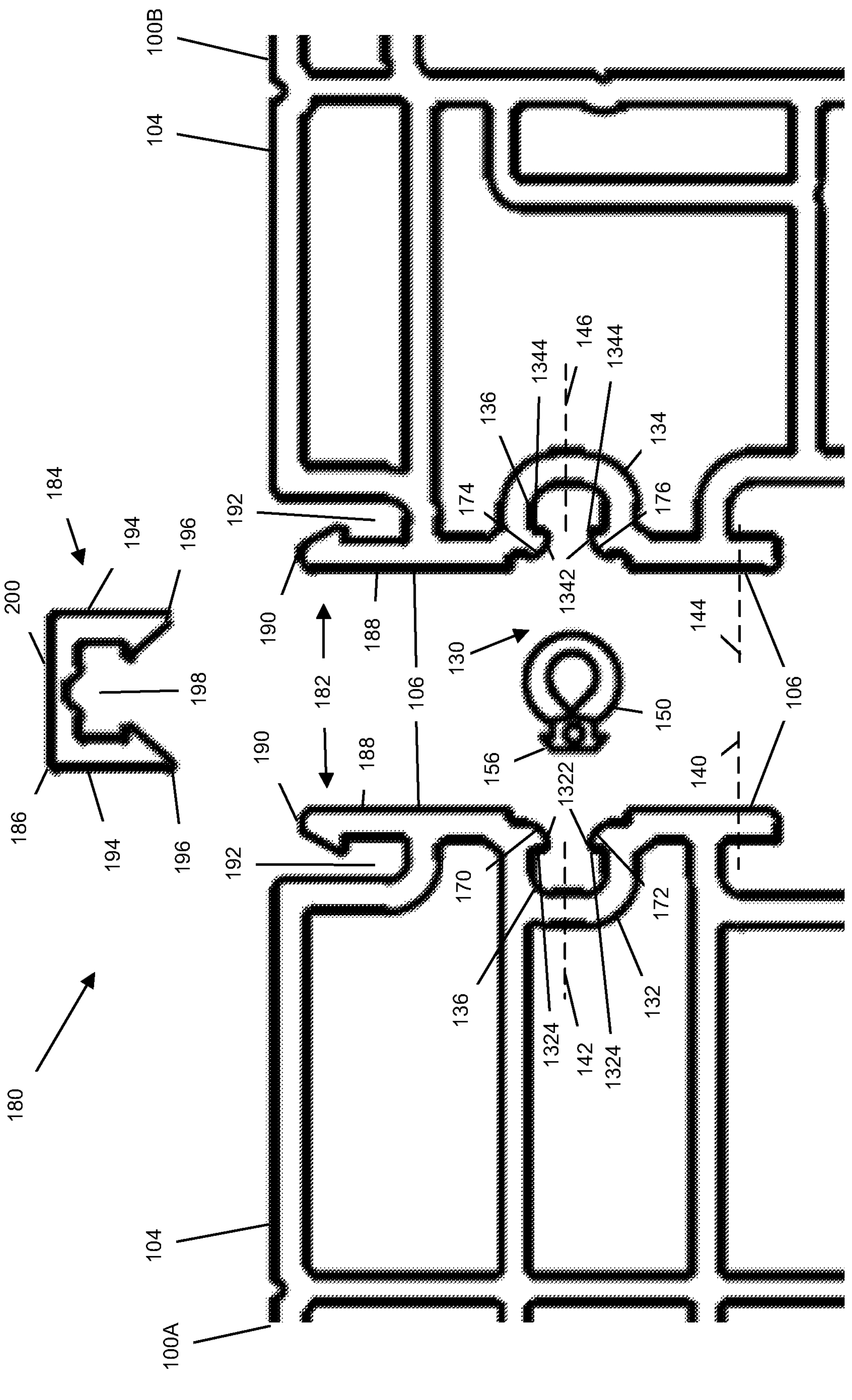
FIG. 5 is an enlarged partial top exploded view of the window assembly of FIG. 1.
Figure 6:
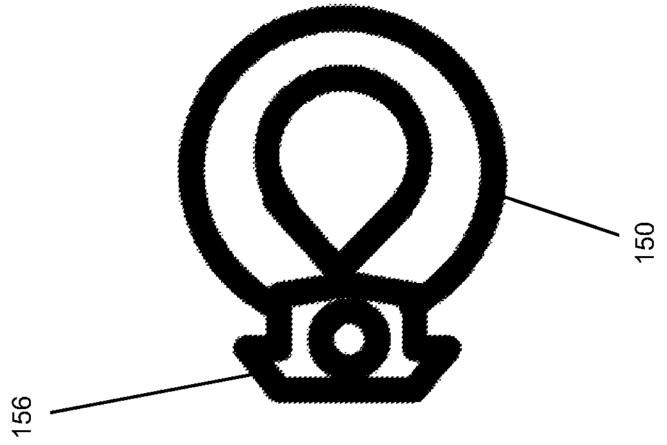
FIG. 6 is a schematic of a seal.

As depicted in FIG. 5, in some embodiments, for example, the seal-receiving channel first counterpart 132 includes side walls 1322 and a base wall 1324, and the seal-receiving channel second counterpart 134 includes side walls 1342 and a base wall 1344.

In some embodiments, for example, as depicted in FIGS. 1 to 5, the first frame member 100A and the second frame member 100B are co-operatively configured such that, while the seal-receiving channel first counterpart 132 is disposed opposite to the seal-receiving channel second counterpart 134, the seal-receiving channel 130 is defined, for example, by at least the first counterpart 132 and the second counterpart 134.

In some embodiments, for example, as depicted in FIGS. 1 to 5, the first frame member 100A and the second frame member 100B are co-operatively configured such that, while the exterior wall 106 of the first frame member 100A is disposed opposite to the exterior wall 106 of the second frame member 100B, the seal-receiving channel 130 is defined, for example, by at least the first counterpart 132 and the second counterpart 134.

In some embodiments, for example, the disposition of the first frame member 100A opposite to the second frame member 100B, with effect that the definition of the seal-receiving channel 130 is defined, is such that the seal-receiving channel first counterpart 132 is disposed in alignment with the seal-receiving channel second counterpart 134. While the first counterpart 132 is disposed in alignment with the second counterpart 134, the seal-receiving channel 130 is defined.

As depicted in FIG. 3, the seal-receiving channel first counterpart 132 is defined on the exterior wall 106 of the first frame member 100A. In some embodiments, for example, the seal-receiving channel first counterpart 132 is extending from the exterior wall 106 of the first frame member 100A. In some embodiments, for example, the seal-receiving channel first counterpart 132 is a recess defined on the exterior wall 106 of the first frame member 100A.

Figure 11:
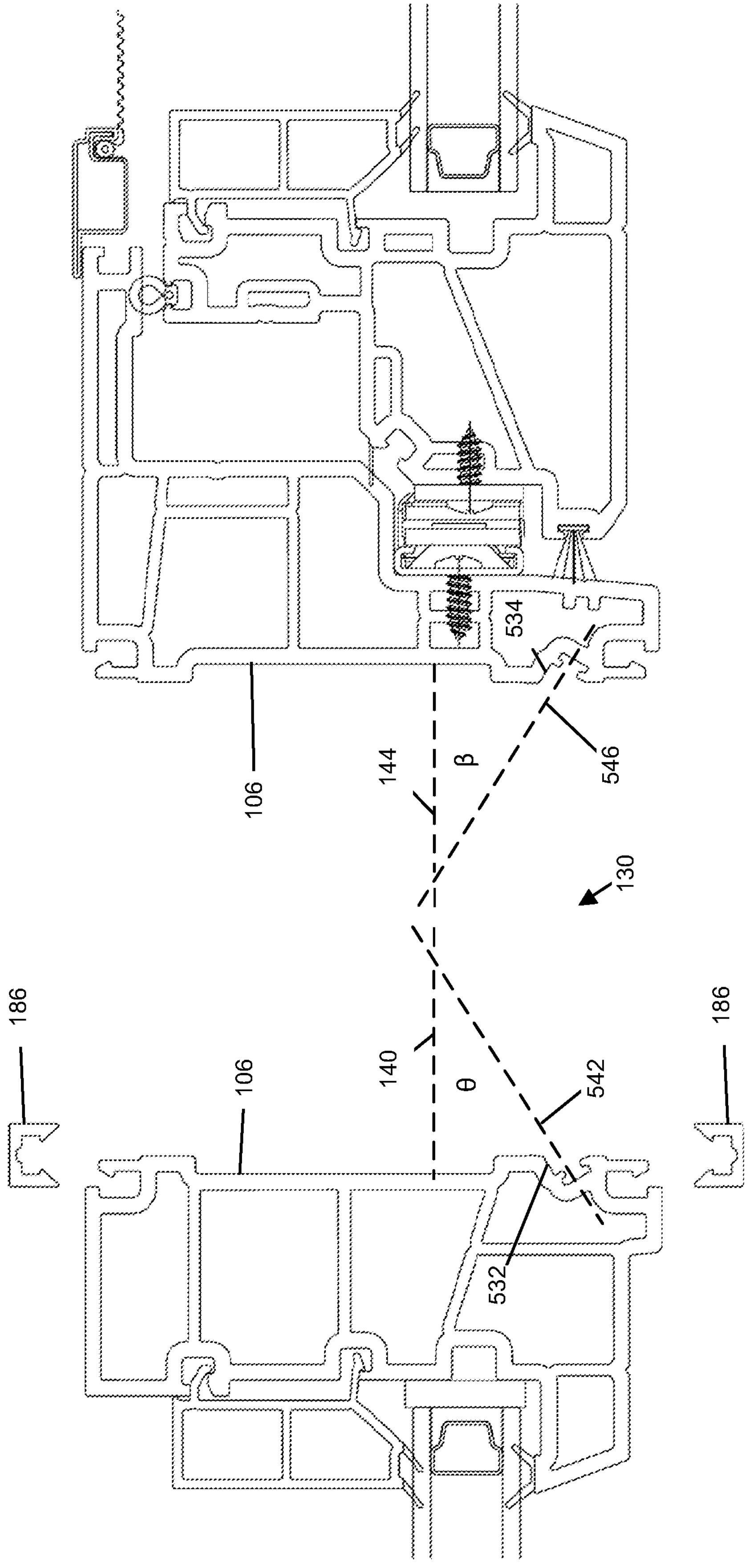
FIG. 11 is a top exploded view of the window assembly of FIG. 8, without the seals disposed in the seal-receiving channel.

In some embodiments, for example, as depicted in FIG. 5, a surface of the exterior wall 106 of the first frame member 100A defines a normal axis 140, and the first counterpart 132 of the seal-receiving channel 130 defines a longitudinal axis 142 that is disposed parallel relative to the normal axis 140 defined by the surface of the exterior wall 106 of the first frame member 100A. In some embodiments, for example, as depicted in FIG. 11, the longitudinal axis 142 defined by the first counterpart 132 of the seal-receiving channel 130 is disposed at an acute angle θ between 0 degrees and 60 degrees, for example, between 0 degrees and 45 degrees, for example, between 5 degrees and 50 degrees, for example, between 10 degrees and 40 degrees, relative to the normal axis 140 defined by the surface of the exterior wall 106 of the first frame member 100A. In some embodiments, for example, the angle θ is 30 degrees. In some embodiments, for example, the angle θ is 45 degrees. In some embodiments, for example, the angle θ is 60 degrees.

In some embodiments, for example, the first counterpart 132 of the seal-receiving channel 130 has an opening with a width of at least 0.125", for example, at least 0.15", for example, at least 0.175", for example, at least 0.20", for example, at least 0.225", for example, at least 0.40". In some embodiments, for example, the first counterpart 132 of the seal-receiving channel 130 has an opening with a width between 0.25" and 0.375", for example, 0.275", for example, 0.30", for example, 0.325", for example, 0.35".

Similarly, as depicted in FIG. 3, the seal-receiving channel second counterpart 134 is defined on the exterior wall 106 of the second frame member 100B. In some embodiments, for example, the seal-receiving channel second counterpart 134 is extending from the exterior wall 106 of the second frame member 100B. In some embodiments, for example, the second counterpart 134 of the seal-receiving channel 130 is a recess defined on the exterior wall 106 of the second frame member 100B.

In some embodiments, for example, as depicted in FIG. 5, a surface of the exterior wall 106 of the second frame member 100B defines a normal axis 144, and the second counterpart 134 of the seal-receiving channel 130 defines a longitudinal axis 146 that is disposed parallel relative to the normal axis 144 defined by the surface of the exterior wall 106 of second first frame member 100B. In some embodiments, for example, as depicted in FIG. 11, the longitudinal axis 146 defined by the second counterpart 134 of the seal-receiving channel 130 is disposed at an acute angle β between 0 degrees and 60 degrees, for example, between 0 degrees and 45 degrees, for example, between 5 degrees and 50 degrees, for example, between 10 degrees and 40 degrees, relative to the normal axis 144 defined by the surface of the exterior wall 106 of the second frame member 100B. In some embodiments, for example, the angle β is 30 degrees. In some embodiments, for example, the angle β is 45 degrees. In some embodiments, for example, the angle β is 60 degrees.

In some embodiments, for example, the angles θ and β have the same magnitude. In some embodiments, for example, the angles θ and β have different magnitudes.

In some embodiments, for example, the second counterpart 134 of the seal-receiving channel 130 has an opening with a width of at least 0.125", for example, at least 0.15", for example, at least 0.175", for example, at least 0.20", for example at least 0.225", for example, at least 0.40". In some embodiments, for example, the second counterpart 134 of the seal-receiving channel 130 has an opening with a width between 0.25" and 0.375", for example, 0.275", for example, 0.30", for example, 0.325", for example, 0.35".

Figure 4:
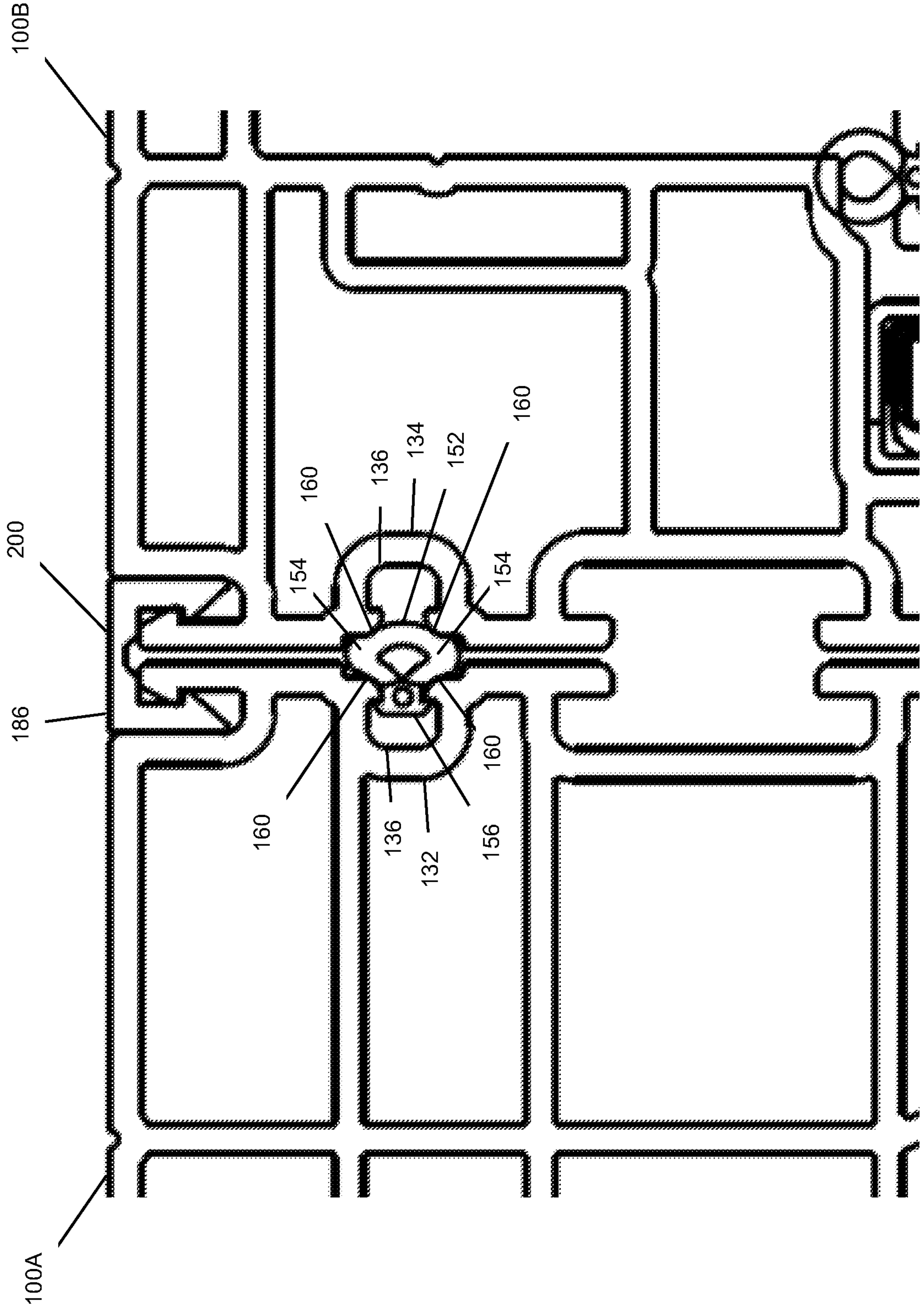
FIG. 4 is an enlarged partial top view of the window assembly of FIG. 1.

As depicted in FIGS. 1 to 5, the seal-receiving channel 130 is configured to have a seal 150 disposed therein. While the seal 150 is disposed in the seal-receiving channel 130, a sealing interface 160 is definable between the seal 150 and at least one of the first frame member 100A and the second frame member 100B, as depicted in FIG. 4. In some embodiments, for example, the sealing interface 160 is definable between the seal 150 and at least one of the first counterpart 132 of the seal-receiving channel 130 of the first frame member 100A and the second counterpart 134 of the seal-receiving channel 130 of the second frame member 100B.

In some embodiments, for example, as depicted in FIGS. 1, 2, and 4, the first and second frame members 100A, 100B are further co-operatively configured such that, while: (i) the exterior wall 106 of the first frame member 100A is disposed opposite to the exterior wall 106 of the second frame member 100B such that the definition of the seal-receiving channel 130 is effected, (ii) the first counterpart 132 of the first frame member 100A and the second counterpart 134 of the second frame member 100B are disposed in a sealing interface-defining proximity, and (iii) the seal 150 is disposed in the seal-receiving channel 130, a sealing interface 160 is established between the first and second frame members 100A, 100B. In some embodiments, for example, the first counterpart 132 of the first frame member 100A and the second counterpart 134 of the second frame member 100B are relatively disposed such that, while the seal 150 is disposed in the seal-receiving channel 130, at least one of the first counterpart 132 of the first frame member 100A and the second counterpart 134 of the second frame member 100B defines the sealing interface 160 with the seal 150. In some embodiments, for example, the sealing interface-defining proximity is a range of distances between the first counterpart 132 of the first frame member 100A and the second counterpart 134 of the second frame member 100B that the sealing interface 160 is defined between the seal 150 and at least one of the first counterpart 132 of the first frame member 100A and the second counterpart 134 of the second frame member 100B. In some embodiments, for example, such range of distances between the first counterpart 132 of the first frame member 100A and the second counterpart 134 of the second frame member 100B such that the first counterpart 132 of the first frame member 100A and the second counterpart 134 of the second frame member 100B is in the sealing interface-defining proximity is defined, in part, by: (i) the characteristics of the seal 150, such as the dimensions and compression ratio of the seal 150, and (ii) the characteristics of the first counterpart 132 and the second counterpart 134, such as the shapes, geometry, and dimensions of the first counterpart 132 and the second counterpart 134. In some embodiments, for example, where the sealing interface-defining proximity is a range, the upper extreme of the sealing interface-defining proximity is the greatest distance between the first counterpart 132 of the first frame member 100A and the second counterpart 134 of the second frame member 100B where the sealing interface 160 is defined between the seal 150 and at least one of the first counterpart 132 of the first frame member 100A and the second counterpart 134 of the second frame member 100B. In some embodiments, for example, the lower extreme of the sealing interface-defining proximity is the shortest distance between the first counterpart 132 of the first frame member 100A and the second counterpart 134 of the second frame member 100B where the sealing interface 160 is defined between the seal 150 and at least one of the first counterpart 132 of the first frame member 100A and the second counterpart 134 of the second frame member 100B.

In some embodiments, for example, while: (i) the seal 150 is disposed in the seal-receiving channel 130, (ii) the first counterpart 132 of the first frame member 100A and the second counterpart 134 of the second frame member 100B are disposed in the sealing interface-defining proximity, and (iii) the sealing interface 160 is defined with the seal 150 and at least one of the first counterpart 132 of the first frame member 100A and the second counterpart 134 of the second frame member 100B, the first frame member 100A and the second frame member 100B are co-operatively configured to resist removal of the seal 150 from the seal-receiving channel 130, such that the sealing interface 160 is maintained in the seal-receiving channel 130. In some embodiments, for example, the first counterpart 132 and the second counterpart 134 are co-operatively configured to resist removal of the seal 150 from the seal-receiving channel 130, such that the sealing interface 160 is maintained in the seal-receiving channel 130.

In some embodiments, for example, while the seal 150 is disposed in the seal-receiving channel 130, the sealing interface 160 is definable between the seal 150, the first counterpart 132 of the seal-receiving channel 130 of the first frame member 100A, and the second counterpart 134 of the seal-receiving channel 130 of the second frame member 100B, as depicted in FIG. 4. In some embodiments, for example, the defining of the sealing interface 160 is defined effected between the seal 150, the first counterpart 132 of the first frame member 100A, and the second counterpart 134 of the second frame member 100B.

In some embodiments, for example, as depicted in FIG. 5, the first counterpart 132 of the seal-receiving channel 130 of the first frame member 100A includes a sealing interface-defining wall 170, and the sealing interface 160 is definable between the seal 150 and the sealing interface-defining wall 170 of the first counterpart 132 of the seal-receiving channel 130. As depicted in FIG. 5, in some embodiments, for example, the sealing interface-defining wall 170 is disposed proximate the opening of the first counterpart 132 of the seal-receiving channel 130 of the first frame member 100A.

As depicted in FIG. 5, in some embodiments, for example, the sealing interface-defining wall 170 of the first counterpart 132 of the seal-receiving channel 130 of the first frame member 100A extends between the side wall 1322 of the first counterpart 132 of the seal-receiving channel 130 and the exterior wall 106 of the first frame member 100A.

In some embodiments, for example, as depicted in FIG. 5, the second counterpart 134 of the seal-receiving channel 130 of the second frame member 100B includes a sealing interface-defining wall 174, and the sealing interface 160 is definable between the seal 150 and the sealing interface-defining wall 174 of the second counterpart 134 of the seal-receiving channel 130. As depicted in FIG. 5, in some embodiments, for example, the sealing interface-defining wall 174 is disposed proximate the opening of the second counterpart 134 of the seal-receiving channel 130 of the second frame member 100B.

As depicted in FIG. 5, in some embodiments, for example, the sealing interface-defining wall 174 of the second counterpart 134 of the seal-receiving channel 130 of the second frame member 100B extends between the side wall 1342 of the second counterpart 134 of the seal-receiving channel 130 and the exterior wall 106 of the second frame member 100B.

In some embodiments, for example, the sealing interface 160 is definable between the seal 150, the sealing interface-defining wall 170 of the first counterpart 132, and the sealing interface-defining wall 174 of the second counterpart 134.

In some embodiments, for example, the first counterpart 132 includes a first sealing interface-defining wall 170 and a second sealing interface-defining wall 172, and the sealing interface 160 is definable between the seal 150, the first sealing interface-defining wall 170 of the first counterpart 132, and the second sealing interface-defining wall 172 of the first counterpart 132. As depicted in FIG. 5, in some embodiments, for example, the first sealing interface-defining wall 170 and the second sealing interface-defining wall 172 are disposed proximate the opening of the first counterpart 132 of the seal-receiving channel 130 of the first frame member 100A, with the first sealing interface-defining wall 170 disposed opposite to the second sealing interface-defining wall 172.

As depicted in FIG. 5, in some embodiments, for example, the first sealing interface-defining wall 170 and the second sealing interface-defining wall 172 of the first counterpart 132 of the seal-receiving channel 130 of the first frame member 100A extends between the side walls 1322 of the first counterpart 132 of the seal-receiving channel 130 and the exterior wall 106 of the first frame member 100A.

In some embodiments, for example, the second counterpart 134 includes a first sealing interface-defining wall 174 and a second sealing interface-defining wall 176, and the sealing interface 160 is definable between the seal 150, the first sealing interface-defining wall 174 of the second counterpart 134, and the second sealing interface-defining wall 176 of the second counterpart 134. As depicted in FIG. 5, in some embodiments, for example, the first sealing interface-defining wall 174 and the second sealing interface-defining wall 176 are disposed proximate the opening of the second counterpart 134 of the seal-receiving channel 130 of the second frame member 100B, with the first sealing interface-defining wall 174 disposed opposite to the second sealing interface-defining wall 176.

As depicted in FIG. 5, in some embodiments, for example, the first sealing interface-defining wall 174 and the second sealing interface-defining wall 176 of the second counterpart 134 of the seal-receiving channel 130 of the second frame member 100B extends between the side walls 1342 of the second counterpart 134 of the seal-receiving channel 130 and the exterior wall 106 of the second frame member 100B.

In some embodiments, for example, as depicted in FIG. 5, the first counterpart 132 of the seal-receiving channel 130 includes the first sealing interface-defining wall 170 and the second sealing interface-defining wall 172, and the second counterpart 134 of the seal-receiving channel 130 includes the first sealing interface-defining wall 174 and the second sealing interface-defining wall 176. In such embodiments, the sealing interface 160 is definable between the seal 150, the first sealing interface-defining wall 170 of the first counterpart 132, the second sealing interface-defining wall 172 of the first counterpart 132, the first sealing interface-defining wall 174 of the second counterpart 134, and the second sealing interface-defining wall 176 of the second counterpart 134.

Figure 10:
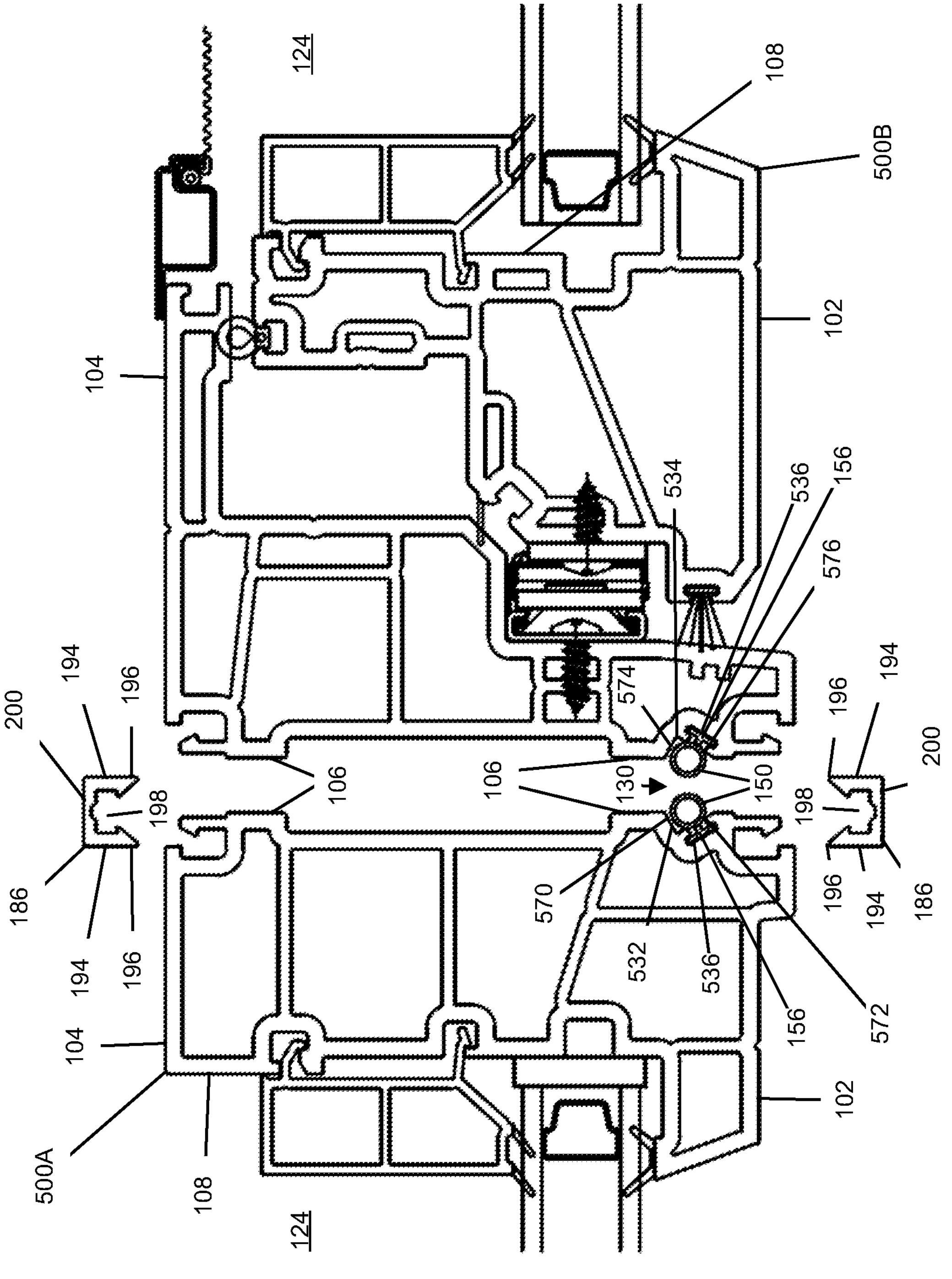
FIG. 10 is a top exploded view of the window assembly of FIG. 8.

In some embodiments, for example, the seal-receiving channel 130 is configured to have more than one seal 150, for example, two seals 150, disposed therein, as depicted in FIG. 10. While the first seal 150 and the second seal 150 are disposed in the seal-receiving channel 130, a sealing interface 160 is definable between the first seal 150 and the second seal 150. In some embodiments, for example, the sealing interface 160 is definable between the first seal 150 and the second seal 150, and between: (a) the first seal 150 and the second seal 150, and (b) at least one of the first counterpart 132 of the seal-receiving channel 130 of the first frame member 100A and the second counterpart 134 of the seal-receiving channel 130 of the second frame member 100B.

In some embodiments, for example, the first and second frame members 100A, 100B are co-operatively configured such that, while: (i) the exterior wall 106 of the first frame member 100A is disposed opposite to the exterior wall 106 of the second frame member 100B such that the definition of the seal-receiving channel 150 is effected, (ii) the first counterpart 132 of the first frame member 100A and the second counterpart 134 of the second frame member 100B are disposed in a sealing interface-defining proximity, and (iii) the first and second seals 150 are disposed in the seal-receiving channel 130, a sealing interface 160 is established between the first and second frame members 100A, 100B and the first seal 150 and the second seal 150, for example, between the first frame member 100A and the first seal 150, between the second frame member 100B and the second seal 150, and between the first seal 150 and the second seal 150.

In some embodiments, for example, while: (i) the first seal 150 and the second seal 150 are disposed in the seal-receiving channel 130, (ii) the first counterpart 132 of the first frame member 100A and the second counterpart 134 of the second frame member 100B are disposed in the sealing interface-defining proximity, and (iii) the sealing interface 160 is defined between the first seal 150 and the second seal 150, and between: (a) the first seal 150 and the second seal 150, and (b) at least one of the first counterpart 132 of the first frame member 100A and the second counterpart 134 of the second frame member 100B, the first frame member 100A and the second frame member 100B are co-operatively configured to resist removal of the first seal 150 and the second seal 150 from the seal-receiving channel 130, such that the sealing interfaces 160 are maintained in the seal-receiving channel 130. In some embodiments, for example, the first counterpart 132 and the second counterpart 134 are co-operatively configured to resist removal of the first seal 150 and the second seal 150 from the seal-receiving channel 130, such that the defined sealing interfaces 160 is are maintained in the seal receiving channel 130.

In some embodiments, for example, while the first seal 150 and the second seal 150 disposed in the seal-receiving channel 130, the sealing interface 160 is definable between the first seal 150 and the second seal 150, and between: (a) the first seal 150 and the second seal 150, (b) the first counterpart 132 of the seal-receiving channel 130 of the first frame member 100A, and (c) the second counterpart 134 of the seal-receiving channel 130 of the second frame member 100B. In some embodiments, for example, the defining of the sealing interface 160 is effected between the first and second seals 150, the first counterpart 132 of the first frame member 100A, and the second counterpart 134 of the second frame member 100B.

In some embodiments, for example, the sealing interface 160 is definable between the first seal 150 and the second seal 150, and between: (a) the first seal 150 and the second seal 150, and (b) the sealing interface-defining wall 170 of the first counterpart 132 of the seal-receiving channel 130.

In some embodiments, for example, the sealing interface 160 is definable between the first seal 150 and the second seal 150, and between: (a) the first seal 150 and the second seal 150, and (b) the sealing interface-defining wall 174 of the second counterpart 134 of the seal-receiving channel 130.

In some embodiments, for example, the sealing interface 160 is definable between the first seal 150 and the second seal 150, and between: (a) the first seal 150 and the second seal 150, (b) the sealing interface-defining wall 170 of the first counterpart 132, and (c) the sealing interface-defining wall 174 of the second counterpart 134.

In some embodiments, for example, the sealing interface 160 is definable between the first seal 150 and the second seal 150, and between: (a) the first seal 150 and the second seal 150, (b) the first sealing interface-defining wall 170 of the first counterpart 132, and (c) the second sealing interface-defining wall 172 of the first counterpart 132.

In some embodiments, for example, the sealing interface 160 is definable between the first seal 150 and the second seal 150, and between: (a) the first seal 150 and the second seal 150, (b) the first sealing interface-defining wall 174 of the second counterpart 134, and (c) the second sealing interface-defining wall 176 of the second counterpart 134.

In some embodiments, for example, the sealing interface 160 is definable between the first seal 150 and the second seal 150, and between: (a) the first seal 150 and the second seal 150, (b) the first sealing interface-defining wall 170 of the first counterpart 132, (c) the second sealing interface-defining wall 172 of the first counterpart 132, (d) the first sealing interface-defining wall 174 of the second counterpart 134, and (e) the second sealing interface-defining wall 176 of the second counterpart 134.

In some embodiments, for example, as depicted in FIG. 4, FIG. 5, FIG. 10, and FIG. 12, while the first counterpart 132 of the first frame member 100A and the second counterpart 134 of the second frame member 100B are disposed in the sealing interface-defining proximity, the first frame member 100A and the second frame member 100B are connectable. The first frame member 100A and the second frame member 100B are configured to be connected, such that while the first frame member 100A and the second frame member 100B are connected, the first counterpart 132 is disposed in opposition to the second counterpart 134 to define the seal-receiving channel 130.

In some embodiments, for example, the first frame member 100A and the second frame member 100B are connected together using appropriate fasteners, such as nuts and bolts, screws, nails, pegs, adhesives, welding, and the like, or connected together using a snap-fit connection, a friction fit connection, an interference connection, and the like.

In some embodiments, for example, as depicted in FIG. 5, a connecting mechanism 180 is configured to connect the first frame member 100A and the second frame member 100B. As depicted in FIG. 5, in some embodiments, for example, the first frame member 100A and the second frame member 100B include a first counterpart 182 of the connecting mechanism 180, and a coupler 186 includes a second counterpart 184 of the connecting mechanism 180, where the second counterpart 184 of the connecting mechanism 180 is complementary to the first counterpart 182 of the connecting mechanism. The first counterpart 182 and the second counterpart 184 of the connecting mechanism 180 are engageable, such that the first counterpart 182 and the second counterpart 184 become retained. As depicted in FIG. 5, in some embodiments, for example, the first counterpart 182 includes an attachment leg 188 that extends from the frame member 100, such as the exterior wall 106. In some embodiments, for example, the end of the attachment leg 188 includes a barb 190. In some embodiments, for example, the attachment leg 188 is resilient, or include one or more resilient portions, so that it is moveable between: (i) a first position for facilitating engagement or interaction of the first counterpart 182 and the second counterpart 184, and (ii) a second position for retention of the first counterpart 182 and the second counterpart 184. In some embodiments, for example, the first counterpart 182 includes a slot 192. As depicted in FIG. 5, the slot 192 is defined between the attachment leg 188, and the internal wall 104 of the frame member 100. In some embodiments, for example, the coupler 186 includes an attachment leg 194.

In some embodiments, for example, the end of the attachment leg 194 includes a barb 196. As depicted in FIG. 5, the coupler 186 includes two attachment legs 194 with barbs 196. In some embodiments, for example, the attachment legs 194 are resilient, or include one or more resilient portions, so that it is moveable between: (i) a first position for facilitating engagement or interaction of the first counterpart 182 and the second counterpart 184, and (ii) a second position for retention of the first counterpart 182 and the second counterpart 184. In some embodiments, for example, the coupler 186 includes a slot 198. In some embodiments, for example, the slot 198 is defined between the two attachment legs 194 of the coupler.

The first counterpart 182 and the second counterpart 184 are co-operatively configured to connect the first frame member 100A and the second frame member 100B upon engagement of the first counterpart 182 and the second counterpart 184. In some embodiments, for example, while the first frame member 100A and the second frame member 100B are disposed in the sealing interface-defining proximity, the first counterpart 182 of the first frame member 100A, the first counterpart 182 of the second frame member 100B, and the coupler 186 are co-operatively configured to connect the first frame member 100A and the second frame member 100B.

While the first frame member 100A and the second frame member 100B are disposed in the sealing interface-defining proximity, the first counterpart 182, such as the attachment leg 188, the barb 190, and the slot 192, of the first frame member 100A and the first counterpart 182, such as the attachment leg 188, the barb 190, and the slot 192, of the second frame member 100B are aligned and parallel, as depicted in FIG. 2 and FIG. 4. While the first counterpart 182 of the first frame member 100A is aligned with the first counterpart 182 of the second frame member 100B, the attachment leg 188 and the barb 190 are disposed in alignment with the slot 198 of the coupler 186, and the attachment leg 194 and the barb 196 are disposed in alignment with the slots 192 of the first frame member 100A and the second frame member 100B, the coupler 186 is pushed towards the first frame member 100A and the second frame member 100B, such that the attachment leg 188 and the barb 190 of the first frame member 100A and the attachment leg 188 and barb 190 of the second frame member 100B are inserted into the slot 198 of the coupler 186, as depicted in FIG. 2 and FIG. 4.

While the attachment leg 188 and the barb 190 of the first frame member 100A and the attachment leg 188 and the barb 190 of the second frame member 100B are being inserted into the slot 198 of the coupler 186, the attachment legs 194 and the barb 196 of the coupler 186 are resiliently displaced to accommodate insertion of the attachment leg 188 and the barb 190 of the first frame member 100A and the attachment leg 188 and the barb 190 of the second frame member 100B into the slot 198 of the coupler 186.

While the coupler 186 is pushed against the first frame member 100A and the second frame member 100B, the attachment legs 194 and the barbs 196 of the coupler 186 are being inserted into the slot 192 of the first frame member 100A and the slot 192 of the second frame member 100B. While the attachment legs 194 and the barbs 196 of the coupler 186 are being inserted into the slot 192 of the first frame member 100A and the slot 192 of the second frame member 100B, the attachment leg 188 and the barb 190 of the first frame member 100A and the attachment leg 188 and the barb 190 of the second frame member 100B are resiliently displaced to accommodate insertion the attachment legs 194 and the barb 196 of the coupler 186 into the slot 192 of the first frame member 100A and the slot 192 of the second frame member 100B.

In some embodiments, for example, the angled surface of the barb 190 of the attachment leg 188 of the first counterpart 182 functions as a cam surface to guide the barb 190 as it is inserted into the slot 198 of the coupler 186. In some embodiments, for example, the angled surface of the barb 196 of the attachment legs 194 of the second counterpart 184 functions as a cam surface to guide the barb 196 as it is inserted into the slots 192 of the first frame member 100A and the second frame member 100B.

Upon: (i) insertion of the attachment leg 188 and the barb 190 of the first frame member 100A and the attachment leg 188 and the barb 190 of the second frame member 100B into the slot 198 of the coupler 186, and (ii) insertion of the attachment legs 194 and the barbs 196 of the coupler 186 into the slot 192 of the first frame member 100A and the slot 192 of the second frame member 100B, the first counterpart 182 and the second counterpart 184 engage to retain the first frame member 100A, the second frame member 100B, and the coupler 186, as depicted in FIG. 2 and FIG. 4. In some embodiments, for example, in response to a force applied to the first frame member 100A, the second frame member 100B, or the coupler 186, to separate the first frame member 100A, the second frame member 100B, and the coupler 186, the barbs 190, for example, the vertical surface of the barbs 190 that extends from the angled surface of the barbs 190, of the first counterpart 182 of the first frame member 100A and the second frame member 100B engage with the barbs 196, for example, the vertical surface of the barbs 196 that extends from the angled surface of the barbs 196, of the second counterpart 184 of the coupler 186 to resist separation of the coupler 186 from the first frame member 100A and the second frame member 100B, thereby retaining the first frame member 100A, the second frame member 100B, and the coupler 186. In this regard, the first frame member 100A and the second frame member 100B are connected together using the coupler 186.

As depicted in FIG. 1, FIG. 2, and FIG. 3, in some embodiments, for example, the first frame member 100A and the second frame member 100B include two first counterparts 182 of the connecting mechanism 180, with the first counterparts 182 disposed on opposite sides of the first frame member 100A and the second frame member 100B, for example, the opposite sides of the first frame member 100A and the second frame member 100B having the external surfaces 102 and the internal surfaces 104, respectively. As depicted in FIGS. 1 to 3, the attachment legs 188 of the first counterparts 182 extend from the exterior wall 106, with the barbs 190 of the first counterparts 182 directed away from each other. In such embodiments, while the first frame member 100A and the second frame member 100B are disposed in the sealing interface-defining proximity, the first counterparts 182 of the first frame member 100A and the first counterparts 182 of the second frame member 100B are aligned and parallel, such that the first frame member 100A and the second frame member 100B are connectable using two couplers 186, as depicted in FIG. 1 and FIG. 2.

As depicted in FIG. 1 and FIG. 2, while the first frame member 100A and the second frame member 100B are connected, in some embodiments, for example, the internal surface 104 of the first frame member 100A is parallel to, or co-planar to, the internal surface 104 of the second frame member 100B. As depicted in FIG. 1 and FIG. 2, while the first frame member 100A and the second frame member 100B are connected, in some embodiments, for example, the external surface 102 of the first frame member 100A is parallel to, or co-planar to, the external surface 102 of the second frame member 100B.

As depicted in FIG. 1 and FIG. 2, in some embodiments, for example, while the first frame member 100A and the second frame member 100B are connected, the internal walls 104 of the first frame member 100A and the second frame member 100B are co-planar. As depicted in FIG. 1 and FIG. 2, in some embodiments, for example, while the first frame member 100A and the second frame member 100B are connected, the external walls 102 of the first frame member 100A and the second frame member 100B are co-planar. In some embodiments, for example, while the coupler 186 is connecting the first frame member 100A and the second frame member 100B, with the coupler 186 disposed on the side of the first frame member 100A and the second frame member 100B having the internal wall 104, a surface 200 of the coupler 186 is disposed relative to the co-planar walls of the first frame member 100A and the second frame member 100B, such as the surface 200 is co-planar with the co-planar walls of the first frame member 100A and the second frame member 100B, as depicted in FIG. 2 and FIG. 4. In some embodiments, for example, the surface 200 is co-planar with the internal walls 104 of the first frame member 100A and the second frame member 100B. This may provide the appearance that the internal wall 104 of the first frame member 100A and the internal wall 104 of the second frame member 100B is a single continuous internal wall 104. This may also provide the appearance that no coupler 186 is used or may obscure the coupler 186 from view.

In some embodiments, for example, the surface 200 is parallel but offset from co-planar walls of the first frame member 100A and the second frame member 100B while the first frame member 100A and the second frame member 100B are connected. In some embodiments, for example, as depicted in FIG. 1 and FIG. 2, while the coupler 186 is connecting the first frame member 100A and the second frame member 100B, with the coupler 186 disposed on the side of the first frame member 100A and the second frame member 100B having the external wall 102, the surface 200 is parallel to but offset from co-planar external walls 102 of the first frame member 100A and the second frame member 100B.

Figure 9:
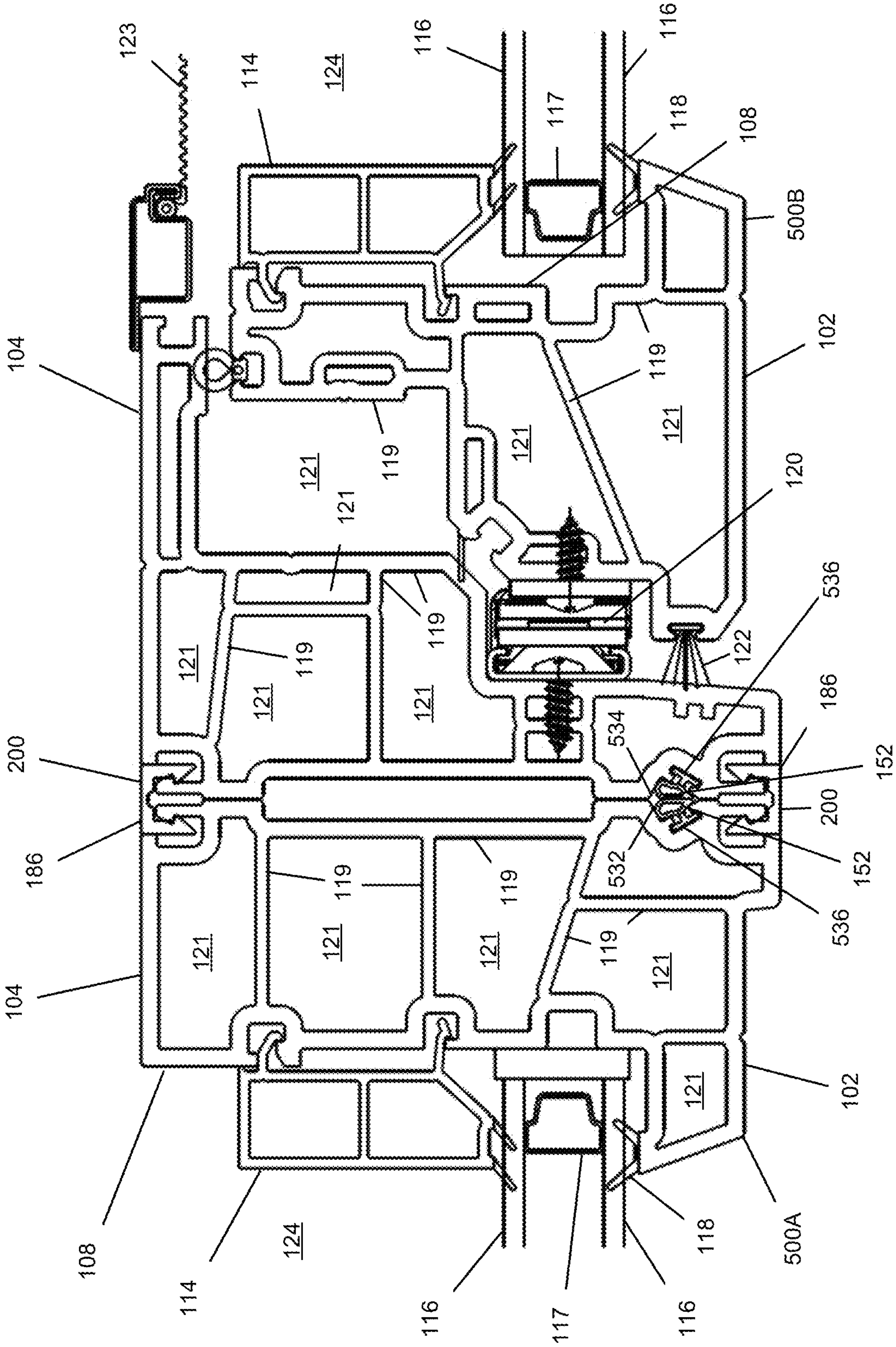
FIG. 9 is a top view of the window assembly of FIG. 8.
Figure 12:
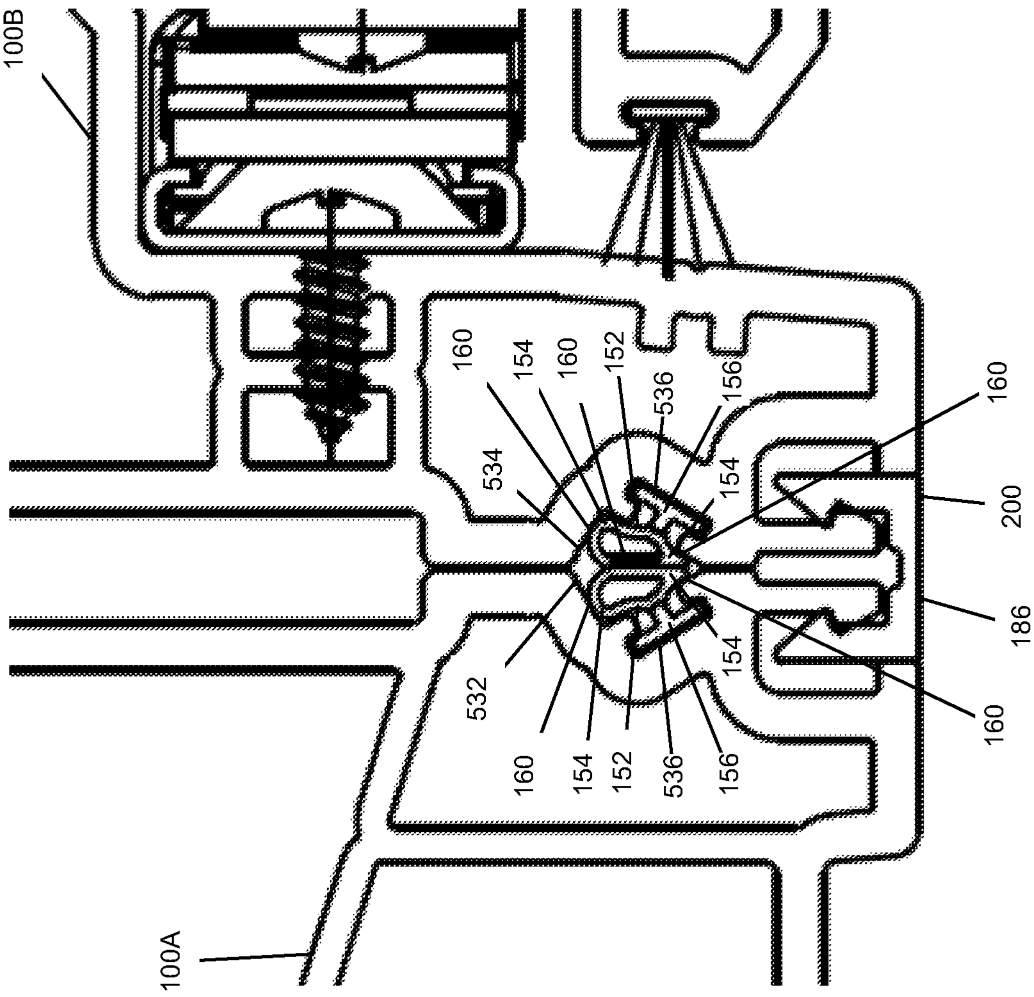
FIG. 12 is an enlarged partial top view of the window assembly of FIG. 8.

In some embodiments, for example, the first and second frame members 100A, 100B are co-operatively configured such that, while: (i) the exterior wall 106 of the first frame member 100A is disposed opposite to the exterior wall 106 of the second frame member 100B such that the definition of the seal-receiving channel 130 is effected, (ii) the seal 150 is disposed in the seal-receiving channel 130 as depicted in FIG. 2 and FIG. 4, or the seals 150 are disposed in the seal-receiving channel 130 as depicted in FIG. 9 and FIG. 12, (iii) the one or more seals 150 include a deformable portion 154 configured for deformation in response to compression of the one or more seals 150; and (iv) the first counterpart 132 of the first frame member 100A and the second counterpart 134 of the second frame member 100B are disposed in a sealing interface-defining proximity, compressing of the one or more seals 150 is effected to define a compressed seal 152 such that a sealing interface 160 is established. The one or more compressed seals 152 has at least one deformable portion 154, as depicted in FIG. 2, FIG. 4, FIG. 9, and FIG. 12. In some embodiments, for example, the deformable portion 154 is a portion of the seal 150 that is configured to extend, protrude, deflect, or deform from the seal 150 due to compression of the seal 150 while the first counterpart 132 of the seal-receiving channel 130 of the first frame member 100A and the second counterpart 134 of the seal-receiving channel 130 of the second frame member 100B are disposed in the sealing interface-defining proximity.

In some embodiments, for example, the one or more compressed seals 152 are compressed at a compression ratio of at least 5%. In some embodiments, for example, the one or more compressed seals 152 are compressed at a compression ratio between 25% and 35%. In some embodiments, for example, the one or more compressed seal 152 are compressed at a compression ratio of 30%.

In some embodiments, for example, while the first counterpart 132 of the first frame member 100A and the second counterpart 134 of the second frame member 100B are disposed in the sealing interface-defining proximity, the deformable portion 154 of the one or more compressed seals 152 are disposed in the seal-receiving channel 130. In some embodiments, for example, the seal-receiving channel 130 is configured to receive the deformable portion 154 of the one or more compressed seals 152. In such embodiments, for example, while the first counterpart 132 of the first frame member 100A and the second counterpart 134 of the second frame member 100B are disposed in the sealing interface-defining proximity, the deformable portion 154 of the one or more compressed seals 152 is received in the seal-receiving channel 130. In some embodiments, for example, the first counterpart 132 of the seal-receiving channel 130 is configured to receive the deformable portion 154 of the one or more compressed seals 152. In some embodiments, for example, the second counterpart 134 of the seal-receiving channel 130 is configured to receive the deformable portion 154 of the one or more compressed seals 152. In some embodiments, for example, both the first counterpart 132 and the second counterpart 134 of the seal-receiving channel 130 are configured to receive the deformable portion 154 of the one or more compressed seals 152. In some embodiments, for example, where two seals 150 are disposed in the seal-receiving channel 130, as depicted in FIG. 9 and FIG. 12, the first counterpart 132 of the seal-receiving channel 130 is configured to receive the deformable portion 154 of the first compressed seal 152, and the second counterpart 134 of the seal-receiving channel 130 is configured to receive the deformable portion 154 of the second compressed seal 152.

In some embodiments, for example, the compression of the one or more seals 150 defines the one or more compressed seals 152 having more than one deformable portion 154. In some embodiments, for example, while the first counterpart 132 of the first frame member 100A and the second counterpart 134 of the second frame member 100B are disposed in the sealing interface-defining proximity, the deformable portions 154 are disposed in the seal-receiving channel 130. In some embodiments, for example, the seal-receiving channel 130 is configured to receive the deformable portions 154 of the one or more compressed seals 152. In such embodiments, for example, while the first counterpart 132 of the first frame member 100A and the second counterpart 134 of the second frame member 100B are disposed in the sealing interface-defining proximity, the deformable portions 154 are received in the seal-receiving channel 130. In some embodiments, for example, the first counterpart 132 of the seal-receiving channel 130 is configured to receive the deformable portions 154 of the one or more compressed seals 152. In some embodiments, for example, the second counterpart 134 of the seal-receiving channel 130 is configured to receive the deformable portions 154 of the one or more compressed seals 152. In some embodiments, for example, both the first counterpart 132 and the second counterpart 134 of the seal-receiving channel 130 are configured to receive the deformable portions 154 of the one or more compressed seals 152. In some embodiments, for example, where two seals 150 are disposed in the seal-receiving channel 130, as depicted in FIG. 9 and FIG. 12, the first counterpart 132 of the seal-receiving channel 130 is configured to receive the deformable portions 154 of the first compressed seal 152, and the second counterpart 134 of the seal-receiving channel 130 is configured to receive the deformable portions 154 of the second compressed seal 152.

In some embodiments, for example, the first frame member 100A and the second frame member 100B are co-operatively configured such that while: (i) the one or more seals 150 are disposed in the seal-receiving channel 130, and the first counterpart 132 of the seal-receiving channel 130 of the first frame member 100A and the second counterpart 134 of the seal-receiving channel 130 of the second frame member 100B are disposed in the sealing interface-defining proximity to define the sealing interface 160, (ii) the one or more seals 150 are compressed to define the one or more compressed seals 152, and (iii) the deformable portion 154 is received in the seal-receiving channel 130, the exterior wall 106 of the first frame member 100A and the exterior wall 106 of the second frame member 100B are aligned. In some embodiments, for example, the exterior wall 106 of the first frame member 100A and the exterior wall 106 of the second frame member 100B are co-operatively configured to align the first frame member 100A and the second frame member 100B. While the exterior wall 106 of the first frame member 100A and the exterior wall 106 of the second frame member 100B are aligned, the exterior wall 106 of the first frame member 100A and the exterior wall 106 of the second frame member 100B are parallel. In some embodiments, for example, while the first frame member 100A and the second frame member 100B are aligned, a longitudinal axis 101A defined by the first frame member 100A and a longitudinal axis 101B defined by the second frame member 100B are parallel.

In some embodiments, for example, the first frame member 100A and the second frame member 100B are co-operatively configured such that while: (i) the one or more seals 150 are disposed in the seal-receiving channel 130, and the first counterpart 132 of the seal-receiving channel 130 of the first frame member 100A and the second counterpart 134 of the seal-receiving channel 130 of the second frame member 100B are disposed in the sealing interface-defining proximity to define the sealing interface 160, (ii) the one or more seals 150 are compressed to define the one or more compressed seals 152, and (iii) the seal deformation portion 154 is received in the seal-receiving channel 130, the exterior wall 106 of the first frame member 100A and the exterior wall 106 of the second frame member 100B are co-operatively configured to resist relative moment of one of the first frame member 100A and the second frame member 100B towards the other of the first frame member 100A and the second frame member 100B.

In some embodiments, for example, the first frame member 100A and the second frame member 100B are co-operatively configured such that while: (i) the one or more seals 150 are disposed in the seal-receiving channel 130, and the first counterpart 132 of the seal-receiving channel 130 of the first frame member 100A and the second counterpart 134 of the seal-receiving channel 130 of the second frame member 100B are disposed in the sealing interface-defining proximity to define the sealing interface 160, (ii) the one or more seals 150 are compressed to define the one or more compressed seals 152, and (iii) the deformable portion 154 is received in the seal-receiving channel 130, the exterior wall 106 of the first frame member 100A and the exterior wall 106 of the second frame member 100B are disposed in an engagement relationship, for example, in an abutting relationship. With the first frame member 100A and the exterior wall 106 of the second frame member 100B are disposed in an engagement relationship, for example, in an abutting relationship, the first frame member 100A and the second frame member 100B are relatively disposed to remain in such relative disposition, such that the first frame member 100A and the second frame member 100B are connectable together, and to facilitate installation of a first window frame, having the first frame member 100A, adjacent to a second window frame, having the second frame member 100B. In some embodiments, for example, the first frame member 100A and the second frame member 100B are co-operatively configured such that, while the sealing interface 160 is established, the exterior wall 106 of the first frame member 100A and the exterior wall 106 of the second frame member 100B are disposed in an abutting relationship.

In some embodiments, for example, the seal-receiving channel 130, by being configured to receive the one or more deformable portions 154 of the one or more compressed seals 152, permits the exterior wall 106 of the first frame member 100A and the exterior wall 106 of the second frame member 100B to be disposed in the engagement relationship, for example, in the abutting relationship.

In this regard, while: (i) the one or more seals 150 are disposed in the seal-receiving channel 130, and the first counterpart 132 of the seal-receiving channel 130 of the first frame member 100A and the second counterpart 134 of the seal-receiving channel 130 of the second frame member 100B are disposed in the sealing interface-defining proximity to define the sealing interface 160, (ii) the one or more seals 150 are compressed to define the one or more compressed seals 152, and (iii) the deformable portion 154 is received in the seal-receiving channel 130, the first frame member 100A and the second frame member 100B are relatively disposed to remain in such relative disposition, such that the first frame member 100A and the second frame member 100B are connectable together, and to facilitate installation of a first window frame, having the first frame member 100A, adjacent to a second window frame, having the second frame member 100B.

As depicted in FIGS. 2 to 6, 10, and 12, in some embodiments, for example, at least one of the first counterpart 132 of the first frame member 100A and the second counterpart 134 of the second frame member 100B includes a slot 136 for retaining a seal 150 relative to the respective at least one of the first and second frame members 100A, 100B. The first and second frame members 100A, 100B are co-operatively configured such that, while: (i) the exterior wall 106 of the first frame member 100A is disposed opposite to the exterior wall 106 of the second frame member 100B such that the definition of the seal-receiving channel 130 is effected, (ii) the first counterpart 132 of the first frame member 100A and the second counterpart 134 of the second frame member 100B are disposed in a sealing interface-defining proximity, (iii) the seal 150 is disposed in the seal-receiving channel 130; and (iv) the retention of the seal 150 is being effected by the slot 136, the sealing interface is established between the first and second frame members 100A and 100B. In some embodiments, for example, where at least one of the first frame member 100A and the second frame member 100B includes the slot 136, the at least one of the first frame member 100A and the second frame member 100B is connectable with the seal 150 via an interaction of the slot 136 and the connector 156 of the seal 150.

As depicted in FIGS. 2 to 6, 10, and 12, in some embodiments, for example, the seal 150 includes a connector 156, and at least one of the first counterpart 132 of the seal-receiving channel 130 of the first frame member 100A and the second counterpart 134 of the seal-receiving channel 130 of the second frame member 100B includes the slot 136 that is configured to receive the connector 156 of the seal 150 for effecting retention of the seal 150 relative to the at least one of the first and second frame members 100A, 100B. In some embodiments, for example, while the connector 156 of the seal 150 is received in the slot 136, the seal 150 is connected to the at least one of the first frame member 100A and the second frame member 100B that includes the slot 136.

In some embodiments, for example, the first and second frame members 100A, 100B are co-operatively configured such that, while: (i) the exterior wall 106 of the first frame member 100A is disposed opposite to the exterior wall 106 of the second frame member 100B such that the definition of the seal-receiving channel 130 is effected, and (ii) and the retention of the seal 150 relative to the at least one of the first and second frame members 100A, 100B is effected, the seal 150 is disposed in the seal receiving channel 130.

In some embodiments, for example, the slot 136 is configured to releasably receive the connector 156 of the seal 150 for effecting retention of the seal 150 relative to the at least one of the first and second frame members 100A, 100B, such that after the connector 156 is received in the slot 136, the connector 156 may be removed or released from the slot 136.

In some embodiments, for example, the slot 136 of the at least one of the first counterpart 132 of the first frame member 100A and the second counterpart 134 of the second frame member 100B is configured to slidably receive the connector 156 of the seal 150 for effecting retention of the seal 150 relative to the at least one of the first and second frame members 100A, 100B.

In some embodiments, for example, the connector 156 is pushed into the slot 136 to connect the frame member 100 and the seal 150, and the connector 156 is pulled out of the slot 136 to disconnect the frame member 100 and the seal 150.

In some embodiments, for example, the connector 156 of the seal 150 is a t-shaped connector, and the slot 136 of the at least one of the first counterpart 132 of the first frame member 100A and the second counterpart 134 of the second frame member is 100B a t-slot. In such embodiments, for example, the t-shaped connector may be slidably received in the t-slot and may be slidably removed or released from the t-slot.

While the connector 156 of the seal 150 is received in the slot 136 of the at least one of the first counterpart 132 of the first frame member 100A and the second counterpart 134 of the second frame member 100B such that the retention of the seal 150 relative to the at least one of the first and second frame members 100A, 100B is effected, in some embodiments, for example, the sealing interface 160 is defined between the seal 150 and the at least one of the first counterpart 132 of the first frame member 100A and the second counterpart 134 of the second frame member 100B.

In some embodiments, for example, both of the first frame member 100A and the second frame member 100B include the slot 136, as depicted in FIGS. 2 to 5, for effecting retention of one or more seals 150 relative to the first and second frame members 100A, 100B. In such embodiments, either one of the first frame member 100A and the second frame member 100B is connectable with the seal 150 via an interaction of the slot 136 of the first frame member 100A and the second frame member 100B and the connector 156 of the seal 150. In some embodiments, for example, the seal 150 includes two connectors 156, such that the seal 150 is connectable with both of the first frame member 100A and the second frame member 100B via: (i) a first interaction of the slot 136 of the first frame member 100A and a first connector 156 of the seal 150, and (ii) a second interaction of the slot 136 of the second frame member 100B and a second connector 156 of the seal 150. In some embodiments, for example, the connectors 156 are slidably received in the slots 136 of the first frame member 100A and the second frame member 100B for effecting retention of the seal 150 relative to the first and second frame members 100A, 100B.

In some embodiments, for example, where both of the first frame member 100A and the second frame member 100B include the slot 136, as depicted in FIGS. 9-12, for effecting retention of one or more seals 150 relative to the first and second frame members 100A, 100B, each of the first frame member 100A and the second frame member 100B are connectable with a respective seal 150, via an interaction of the slot 136 of the first frame member 100A and the connector 156 of the first seal 150, and via an interaction of the slot 136 of the second frame member 100B and the connector 156 of the second seal 150.

In some embodiments, for example, the seal 150 is a bulb seal, a gasket seal, an o-shape seal, a push-in seal, a push-in extruded seal, a t-slot mount seal, a weather strip, and the like.

Figure 7:
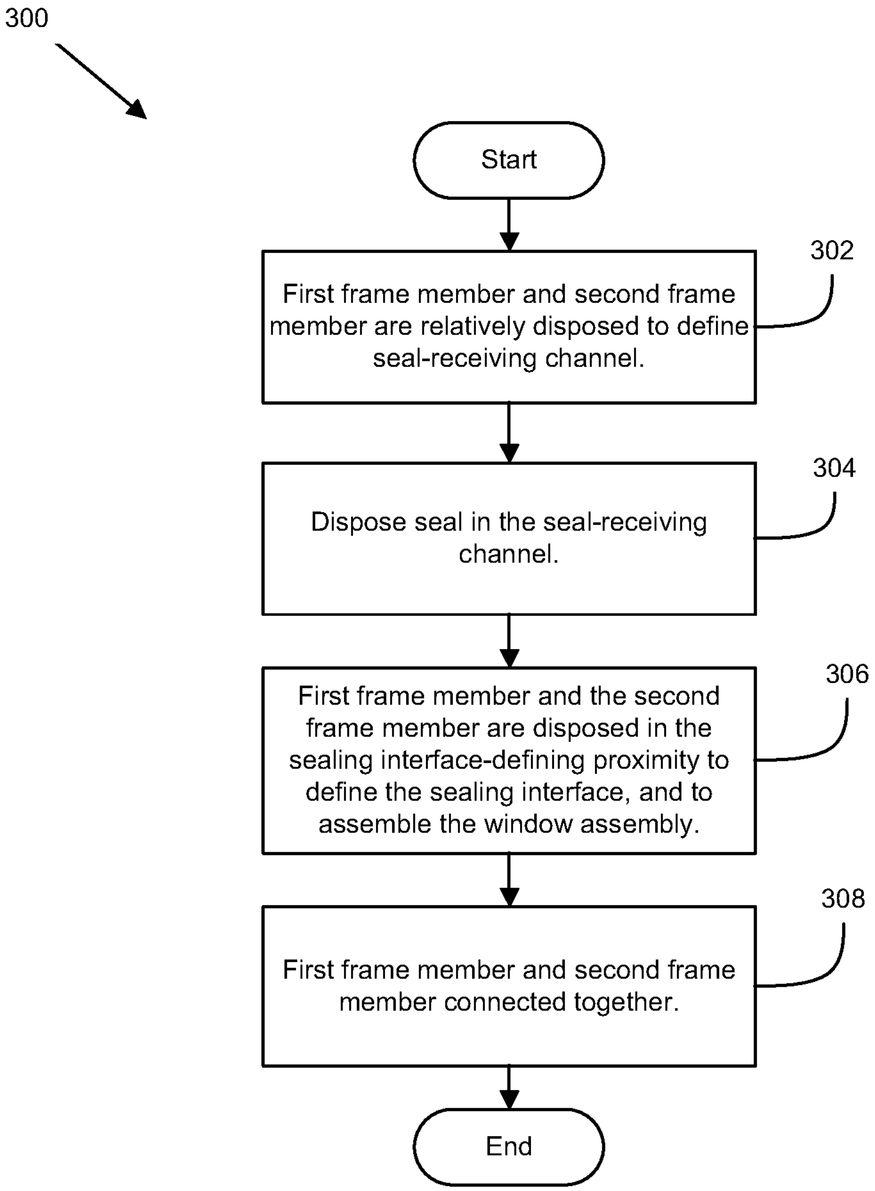
FIG. 7 is a flow chart depicting a method of assembling a window assembly.
Figure 8:
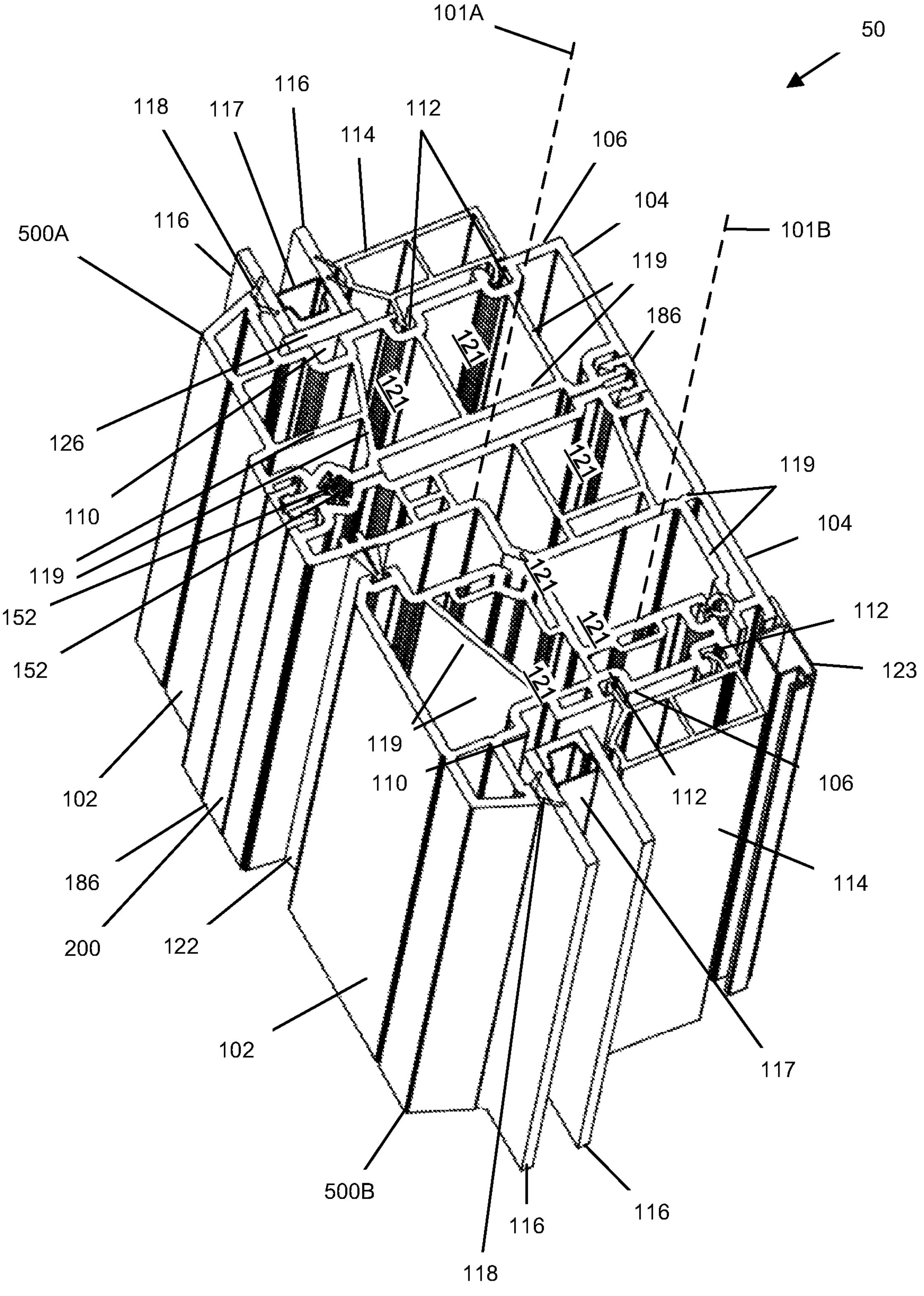
FIG. 8 is a perspective view of another window assembly.

FIG. 7 is a flow chart depicting a method 300 of assembling a window assembly.

At 302, the first frame member 100A and the second frame member 100B are relatively disposed to define the seal-receiving channel 130. In some embodiments, for example, the exterior wall 106 of the first frame member 100A is disposed opposite to the exterior wall 106 of the second frame member 100B to define the seal-receiving channel 130.

At 304, while the seal-receiving channel 130 is defined, the seal 150 is disposed in the seal-receiving channel 130. In some embodiments, for example, the seal 150 is connected to at least one of the first frame member 100A and the second frame member 100B for retaining the seal 150 relative to at least one of the first frame member 100A and the second frame member 100B, such that the seal 150 remains disposed in the seal-receiving channel 130. In some embodiments, for example, the seal 150 includes at least one connector 156, and at least one, or both, of the first frame member 100A and the second frame member 100B includes the slot 136 for effecting retention of the seal 150 relative to the first frame member 100A and the second frame member 100B. In such embodiments, the seal 150 is connectable to at least one, or both, of the first frame member 100*a* and the second frame member 100B via interaction with the at least one connector 156 and the at least one slot 136. In some embodiments, for example, the seal 150 is connected to at least one of the first frame member 100*a* and the second frame member 100B prior to relative disposition of the first frame member 100A and the second frame member 100B to define the seal-receiving channel 130.

At 306, with the seal 150 disposed in the seal-receiving channel 130, the first frame member 100A and the second frame member 100B are disposed in the sealing interface-defining proximity to define the sealing interface 160. In some embodiments, for example, the sealing interface 160 is defined between at least one of the first counterpart 132 of the seal-receiving channel 130 and the second counterpart 134 of the seal-receiving channel 130. In some embodiments, for example, one or more sealing interfaces 160 are defined between at least one of the first counterpart 132 of the seal-receiving channel 130 and the second counterpart 134 of the seal-receiving channel 130. In some embodiments, for example, the sealing interface 160 is defined between both of the first counterpart 132 of the seal-receiving channel 130 and the second counterpart 134 of the seal-receiving channel 130. In some embodiments, for example, one or more sealing interfaces 160 are defined between both of the first counterpart 132 of the seal-receiving channel 130 and the second counterpart 134 of the seal-receiving channel 130.

In some embodiments, for example, while the seal 150 is disposed in the seal-receiving channel 130, and the first counterpart 132 of the first frame member 100A and the second counterpart 134 of the second frame member 100B are disposed in the sealing interface-defining proximity, to define the sealing interface 160, the seal 150 is compressed to define the compressed seal 152, the compressed seal 152 having the one or more deformable portions 154.

With the first counterpart 132 of the first frame member 100A and the second counterpart 134 of the second frame member 100B are disposed in the sealing interface-defining proximity, and with the sealing interface 160 defined, the window assembly is assembled.

While the seal 150 is compressed to define the compressed seal 152, in some embodiments, for example, the one or more deformable portions 154 is received in the seal-receiving channel 130, such that the exterior wall 106 of the first frame member 100A and the exterior wall 106 of the second frame member 100B are disposable in an abutting relationship.

At 308, while the seal 150 is compressed to define the compressed seal 152, and while the exterior wall 106 of the first frame member 100A and the exterior wall 106 of the second frame member 100B are disposed in an abutting relationship, the first frame member 100A and the second frame member 100B are connectable together, for example, using appropriate fasteners, such as nuts and bolts, screws, nails, pegs, adhesives, welding, and the like, or connected together using a snap-fit connection, a friction fit connection, an interference connection, and the like. In some embodiments, for example, the first frame member 100A and the second frame member 100B include the first counterpart 182 of the connecting mechanism 180, the coupler 186 has the second counterpart 184 of the connecting mechanism 180, and the first frame member 100A and the second frame member 100B are connectable via the coupler 186.

In some embodiments, for example, where the first frame member 100A and the second frame member 100B are part of adjacent first and second window frames to be installed in a wall of a room, the first frame member 100A and the second frame member 100B may be disposed in a side-by-side relationship, or may be disposed one above the other.

In some embodiments, for example, a kit for a window assembly or parts for a window assembly includes the first frame member 100A and the second frame member 100B In some embodiments, for example, while the seal 150 is disposed in the seal-receiving channel 130, and the first frame member 100A and the second frame member 100B are installed as part of first and second window frames, the sealing interface 160 defined between the first frame member 100A and the second frame member 100B may resist fluid communication through the space between the frame members 100 between the inside of the room and the outside of the room. In some embodiments, for example, while the seal 150 is disposed in the seal-receiving channel 130, and the first frame member 100A and the second frame member 100B are installed as part of first and second window frames, the sealing interface 160 defined between the first frame member 100A and the second frame member 100B may resist fluid ingress through the space between the frame members 100 between the inside of the room and the outside of the room.

In addition, while the sealing interface 160 defined between the first frame member 100A and the second frame member 100B, the quality of insulation between the first frame member 100A and the second frame member 100B may be improved, such that excessive heating or cooling of the room to maintain a desired temperature may be avoided, thereby saving the energy that may be used for said excessive heating or cooling of the room.

Moreover, the seal 150 disposed in the seal-receiving channel 130 may prevent or mitigate ingress of debris between the frame members 100 and into the room.

Further, the connection system used to connect the first frame member 100A and the second frame member 100B may provide a connection between the first frame member 100A and the second frame member 100B that may be more reliable than those provided by existing connection systems between frame members.

Additionally, a connection system other than existing connection systems may be used to connect the first frame member 100A and the second frame member 100B. By being able to use a connection system to connect the first frame member 100A and the second frame member 100B that may be different from existing connection systems, the design and cost limitations of such existing connecting systems may be absent, such that windows frames of different sizes and configurations may be designed.

FIGS. 8 to 12 depict an example window assembly 50, which includes a first frame member 500A and a second frame member 500B. The first frame member 500A substantially corresponds to the first frame member 100A, and the second frame member 500B substantially corresponds to the second frame member 100B, except the first frame member 500A has a first counterpart 532 of the seal-receiving channel 130 that is at an angled configuration relative to the exterior wall 106 of the first frame member 500A, and the second frame member 500B has a second counterpart 534 of the seal-receiving channel 130 that is at an angled configuration relative to the second counterpart 134 of the second frame member 100B. As depicted in FIG. 11, a longitudinal axis 542 defined by the first counterpart 532 of the seal-receiving channel 130 is disposed at an acute angle θ between 0 degrees and 60 degrees, for example, between 0 degrees and 45 degrees, for example, between 5 degrees and 50 degrees, for example, between 10 degrees and 40 degrees, relative to the normal axis 140 of the exterior wall 106 of the first frame member 500A, and the longitudinal axis 546 defined by a second counterpart 534 of the seal-receiving channel 130 is disposed at an acute angle β between 0 degrees and 60 degrees, for example, between 0 degrees and 45 degrees, for example, between 5 degrees and 50 degrees, for example, between 10 degrees and 40 degrees, relative to the normal axis 144 of the exterior wall 106 of the second frame member 500B. In some embodiments, for example, the angles θ and β have the same magnitude. In some embodiments, for example, the angles θ and β have different magnitudes. In some embodiments, for example, the angle θ is 30 degrees. In some embodiments, for example, the angle θ is 45 degrees. In some embodiments, for example, the angle θ is 60 degrees. In some embodiments, for example, the angle β is 30 degrees. In some embodiments, for example, the angle β is 45 degrees. In some embodiments, for example, the angle β is 60 degrees.

As depicted in FIGS. 9, 10, and 12, at least one, or both, of the first frame member 500A and the second frame member 500B includes the slot 536 that is configured to receive the connector 156 of the seal 150, for effecting retention of one or more seals 150 relative to the first and second frame members 500A, 500B. The slot 536 of the first frame member 500A and the second frame member 500B substantially corresponds to the slot 136 of the first frame member 100A and the second frame member 100B.

As depicted in FIG. 10, the first counterpart 532 of the seal-receiving channel 130 of the first frame member 500A includes a first sealing interface-defining wall 570 and a second sealing interface-defining wall 572, and the second counterpart 534 of the seal-receiving channel 130 of the second frame member 500B includes a first sealing interface-defining wall 574 and a second sealing interface-defining wall 576. The first sealing interface-defining wall 570 and a second sealing interface-defining wall 572 of the first frame member 500A substantially correspond to the first sealing interface-defining wall 170 and a second sealing interface-defining wall 172 of the first frame member 100A, and the first sealing interface-defining wall 574 and the second sealing interface-defining wall 576 of the second frame member 500B substantially correspond to the first sealing interface-defining wall 174 and the second sealing interface-defining wall 176 of the second frame member 100B.

In some embodiments, for example, a seal 150 is disposable within the seal-defining channel 130 defined by the first frame member 500A and the second frame member 500A, such that the sealing interface 160 is definable between the seal 150 and at least one of, or both of, the first counterpart 532 of the seal-receiving channel 130 and the second counterpart 534 of the seal-receiving channel 130. As depicted in FIGS. 9 to 12, in some embodiments, for example, two seals 150 are disposable in the seal-receiving channel 130. In such embodiments, for example, the sealing interface 160 is definable between the first seal 150 and the second seal 150, and between: (a) the first seal 150 and the second seal 150, and (b) at least one of, or both of, the first counterpart 532 of the seal-receiving channel 130 and the second counterpart 534 of the seal-receiving channel 130.

As depicted in FIG. 10, the first counterpart 532 of the seal-receiving channel 130 of the first frame member 500A includes a first sealing interface-defining wall 570 and a second sealing interface-defining wall 572, and the second counterpart 534 of the seal-receiving channel 130 of the second frame member 500B includes a first sealing interface-defining wall 574 and a second sealing interface-defining wall 576. The first sealing interface-defining wall 570 and a second sealing interface-defining wall 572 of the first frame member 500A substantially correspond to the first sealing interface-defining wall 170 and a second sealing interface-defining wall 172 of the first frame member 100A, and the first sealing interface-defining wall 574 and the second sealing interface-defining wall 576 of the second frame member 500B substantially correspond to the first sealing interface-defining wall 174 and the second sealing interface-defining wall 176 of the second frame member 100B. In some embodiments, for example, the sealing interface 160 is definable between the one or more seals 150 disposed in the seal-receiving channel 130, and one or more of the first sealing interface-defining wall 570, the second sealing interface-defining wall 572, the first sealing interface-defining wall 574, and the second sealing interface-defining wall 576.

The preceding discussion provides many example embodiments. Although each embodiment represents a single combination of inventive elements, other examples may include all suitable combinations of the disclosed elements. Thus if one embodiment comprises elements A, B, and C, and a second embodiment comprises elements B and D, other remaining combinations of A, B, C, or D, may also be used.

The term "connected" or "coupled to" may include both direct coupling (in which two elements that are coupled to each other contact each other) and indirect coupling (in which at least one additional element is located between the two elements).

Although the embodiments have been described in detail, it should be understood that various changes, substitutions and alterations could be made herein.

Moreover, the scope of the present application is not intended to be limited to the particular embodiments of the process, machine, manufacture, and composition of matter, means, methods and steps described in the specification. As one of ordinary skill in the art will readily appreciate from the disclosure of the present invention, processes, machines, manufacture, compositions of matter, means, methods, or steps, presently existing or later to be developed, that perform substantially the same function or achieve substantially the same result as the corresponding embodiments described herein may be utilized. Accordingly, the appended claims are intended to include within their scope such processes, machines, manufacture, compositions of matter, means, methods, or steps.

As can be understood, the examples described above and illustrated are intended to be examples only. The invention is defined by the appended claims.

What is claimed is:

1. A kit for a window assembly, comprising:

a first frame member that includes:

an exterior wall, defining:

a seal-receiving channel first counterpart that includes a first seal retainer; and an outermost surface:

an interior wall that is disposed on an opposite side of the first frame member relative to the exterior wall; and a pane-receiving space, defined by the interior wall, that is configured to receive a glass pane;

a second frame member that includes:

an exterior wall, defining:

a seal-receiving channel second counterpart that includes a second seal retainer; and an outermost surface;

an interior wall that is disposed on an opposite side of the second frame member relative to the exterior wall; and a pane-receiving space, defined by the interior wall, that is configured to receive a glass pane;

wherein:

the first seal retainer of the first frame member is configured for interacting with a seal to effectuate retention of the seal to the first frame member, and the second seal retainer of the second frame member is configured for interacting with the seal to effectuate retention of the seal to the second frame member, such that the seal is retainable to either one of: (a) the first frame member via the first seal retainer, and (b) the second frame member via the second seal retainer;

the first and second frame members are co-operatively configured such that, while the exterior wall of the first frame member is disposed opposite to the exterior wall of the second frame member for assembling the window assembly:

the seal-receiving channel first counterpart is disposed opposite to the seal-receiving channel second counterpart, and co-operate to define a seal receiving channel;

the outermost surface of the exterior wall of the first frame member is disposed in contact engagement with the outermost surface of the exterior wall of the second frame member, and co-operate such that relative rotation, between the first frame member and the second frame member, about an axis of rotation that is parallel to a longitudinal axis of the first frame member, is opposed by the outermost surface of the exterior wall of the first frame member and the outermost surface of the exterior wall of the second frame member; and the seal-receiving channel is configured for disposition of the seal therein.

2. The kit of claim 1, wherein:

the first and second frame members are further co-operatively configured such that, while: (i) the exterior wall of the first frame member is disposed opposite to the exterior wall of the second frame member for assembling the window assembly, such that the definition of the seal-receiving channel is effected, and the relative rotation, between the first frame member and the second frame member, about the axis of rotation, is opposed by the outermost surface of the exterior wall of the first frame member and the outermost surface of the exterior wall of the second frame member, (ii) the seal-receiving channel first counterpart of the first frame member and the seal-receiving channel second counterpart of the second frame member are disposed in a sealing interface-defining proximity, (iii) the seal is retained to the either one of: (a) the first frame member via the first seal retainer, and (b) the second frame member via the second seal retainer, and (iv) the seal is disposed in the seal-receiving channel:

a sealing interface is established between the first and second frame members.

3. The kit of claim 2, wherein:

the first frame member and the second frame member are further co-operatively configured such that, while the sealing interface is established, the contact engagement of the outermost surface of the exterior wall of the first frame member with the outermost surface of the exterior wall of the second frame member is an abutting engagement.

4. The kit of claim 2, wherein:

the defining of the sealing interface is effected between the seal, the seal-receiving channel first counterpart of the first frame member, and the seal-receiving channel second counterpart of the second frame member.

5. The kit of claim 2, wherein:

while the seal-receiving channel first counterpart of the first frame member and the seal-receiving channel second counterpart of the second frame member are disposed in the sealing interface-defining proximity, the first frame member and the second frame member are connectable.

6. The kit of claim 1, wherein:

the first and second frame members are further co-operatively configured such that, while: (i) the exterior wall of the first frame member is disposed opposite to the exterior wall of the second frame member for assembling the window assembly, such that the definition of the seal-receiving channel is effected, and the relative rotation, between the first frame member and the second frame member, about the axis of rotation, is opposed by the outermost surface of the exterior wall of the first frame member and the outermost surface of the exterior wall of the second frame member, (ii) the seal is retained to the either one of: (a) the first frame member via the first seal retainer, and (b) the second frame member via the second seal retainer, (iii) the seal is disposed in the seal-receiving channel, (iv) the seal includes a deformable portion configured for deformation in response to compression of the seal; and (v) the seal-receiving channel first counterpart of the first frame member and the seal-receiving channel second counterpart of the second frame member are disposed in a sealing interface-defining proximity:

compressing of the seal is effected to define a compressed seal such that a sealing interface is established.

7. The kit of claim 6, the seal-receiving channel is configured to receive the deformable portion of the compressed seal.

8. The kit of claim 1, wherein the seal-receiving channel first counterpart includes a recess.

9. The kit of claim 1, wherein the outermost surface of the exterior wall of the first frame member defines a normal axis, and the seal-receiving channel first counterpart defines a longitudinal axis that is disposed at an acute angle between 0 degrees and 45 degrees relative to the normal axis defined by the outermost surface of the exterior wall of the first frame member.

10. The kit of claim 1, wherein the seal-receiving channel second counterpart includes a recess.

11. The kit of claim 1, wherein the outermost surface of the exterior wall of the second frame member defines a normal axis, and the seal-receiving channel second counterpart defines a longitudinal axis that is disposed at an acute angle between 0 degrees and 45 degrees relative to the normal axis defined by the outermost surface of the exterior wall of the second frame member.

12. The kit of claim 1, wherein the seal-receiving channel first counterpart of the first frame member has an opening with a width of at least 0.125".

13. The kit of claim 1, wherein the seal-receiving channel second counterpart of the second frame member has an opening with a width of at least 0.125".

14. The kit of claim 1, wherein:

the first seal retainer includes a slot for interacting with the seal to effectuate the retention of the seal to the first frame member; and the second seal retainer includes a slot for interacting with the seal to effectuate the retention of the seal to the second frame member.

15. The kit of claim 1, wherein the first frame member and the second frame member are extruded lineals.

16. The kit of claim 1, wherein the first frame member is a frame member of a first frame, and the second frame member is a frame member of a second frame.

17. The kit of claim 1, wherein:

the retainability of the seal to the either one of: (a) the first frame member via the first seal retainer, and (b) the second frame member via the second seal retainer, is such that the seal is retainable to both of: (a) the first frame member via the first seal retainer, and (b) the second frame member via the second seal retainer.

18. The kit of claim 1, wherein:

the seal is a first seal;

the first seal retainer of the first frame member is configured for interacting with the first seal to effectuate retention of the first seal to the first frame member, the second seal retainer of the second frame member is configured for interacting with a second seal to effectuate retention of the second seal to the second frame member, such that the first seal is retainable to the first frame member via the first seal retainer, and the second seal is retainable to the second frame member via the second seal retainer; and the seal receiving channel is configured for disposition of the first seal and the second seal therein.

19. The kit of claim 18, wherein:

the first and second frame members are further co-operatively configured such that, while: (i) the exterior wall of the first frame member is disposed opposite to the exterior wall of the second frame member for assembling the window assembly, such that the definition of the seal-receiving channel is effected, and the relative rotation, between the first frame member and the second frame member, about the axis of rotation, is opposed by the outermost surface of the exterior wall of the first frame member and the outermost surface of the exterior wall of the second frame member, (ii) the seal-receiving channel first counterpart of the first frame member and the seal-receiving channel second counterpart of the second frame member are disposed in a sealing interface-defining proximity, (iii) the first seal is retained to the first frame member via the first seal retainer and the second seal is retained to the second frame member via the second seal retainer, and (iv) the first seal and the second seal are disposed in the seal-receiving channel:

a sealing interface is established between the first and second seals.

20. The kit of claim 1, wherein:

the opposition of the relative rotation, between the first frame member and the second frame member, about the axis of rotation, by the outermost surface of the exterior wall of the first frame member and the outermost surface of the exterior wall of the second frame member, is a prevention of the relative rotation, between the first frame member and the second frame member, about the axis of rotation, by the outermost surface of the exterior wall of the first frame member and the outermost surface of the exterior wall of the second frame member.

21. The kit of claim 1, wherein:

the axis of rotation is parallel to a longitudinal axis of the second frame member.

22. The kit of claim 1, wherein:

the axis of rotation is disposed between the exterior wall of the first frame member and the exterior wall of the second frame member.

23. A kit for a window assembly, comprising:

a first frame member that includes:

an exterior wall, defining:

a seal-receiving channel first counterpart that includes a first seal retainer; and an outermost surface;

an interior wall that is disposed on an opposite side of the first frame member relative to the exterior wall; and a glass stop-receiving channel, defined by the interior wall, that is configured to receive a glass stop;

a second frame member that includes:

an exterior wall, defining:

a seal-receiving channel second counterpart that includes a second seal retainer; and an outermost surface;

an interior wall that is disposed on an opposite side of the second frame member relative to the exterior wall; and a glass stop-receiving channel, defined by the interior wall, that is configured to receive a glass stop;

wherein:

the first seal retainer of the first frame member is configured for interacting with a seal to effectuate retention of the seal to the first frame member, and the second seal retainer of the second frame member is configured for interacting with the seal to effectuate retention of the seal to the second frame member, such that the seal is retainable to either one of: (a) the first frame member via the first seal retainer, and (b) the second frame member via the second seal retainer;

the first and second frame members are co-operatively configured such that, while the exterior wall of the first frame member is disposed opposite to the exterior wall of the second frame member for assembling the window assembly:

the seal-receiving channel first counterpart is disposed opposite to the seal-receiving channel second counterpart, and co-operate to define a seal receiving channel;

the outermost surface of the exterior wall of the first frame member is disposed in contact engagement with the outermost surface of the exterior wall of the second frame member, and co-operate such that relative rotation, between the first frame member and the second frame member, about an axis of rotation that is parallel to a longitudinal axis of the first frame member, is opposed by the outermost surface of the exterior wall of the first frame member and the outermost surface of the exterior wall of the second frame member; and the seal-receiving channel is configured for disposition of the seal disposed therein.

24. The kit of claim 23, wherein:

the retainability of the seal to the either one of: (a) the first frame member via the first seal retainer, and (b) the second frame member via the second seal retainer, is such that the seal is retainable to both of: (a) the first frame member via the first seal retainer, and (b) the second frame member via the second seal retainer.

25. The kit of claim 23, wherein:

the opposition of the relative rotation, between the first frame member and the second frame member, about the axis of rotation, by the outermost surface of the exterior wall of the first frame member and the outermost surface of the exterior wall of the second frame member, is a prevention of the relative rotation, between the first frame member and the second frame member, about the axis of rotation, by the outermost surface of the exterior wall of the first frame member and the outermost surface of the exterior wall of the second frame member.

26. The kit of claim 23, wherein:
the axis of rotation is parallel to a longitudinal axis of the second frame member.

27. The kit of claim 23, wherein:
the axis of rotation is disposed between the exterior wall of the first frame member and the exterior wall of the second frame member.

28. A window assembly, comprising:
a first frame member that includes:
an exterior wall, defining:
a seal-receiving channel first counterpart that includes a first seal retainer; and
an outermost surface:
an interior wall that is disposed on an opposite side of the first frame member relative to the exterior wall; and
a pane-receiving space, defined by the interior wall, that is configured to receive a glass pane;
a second frame member that includes:
an exterior wall, defining:
a seal-receiving channel second counterpart that includes a second seal retainer; and
an outermost surface;
an interior wall that is disposed on an opposite side of the second frame member relative to the exterior wall; and
a pane-receiving space, defined by the interior wall, that is configured to receive a glass pane;
wherein:
the first seal retainer of the first frame member is configured for interacting with a seal to effectuate retention of the seal to the first frame member, and the second seal retainer of the second frame member is configured for interacting with the seal to effectuate retention of the seal to the second frame member, such that the seal is retainable to either one of: (a) the first frame member via the first seal retainer, and (b) the second frame member via the second seal retainer;
the first and second frame members are co-operatively configured such that, while the exterior wall of the first frame member is disposed opposite to the exterior wall of the second frame member for assembling the window assembly:
the seal-receiving channel first counterpart is disposed opposite to the seal-receiving channel second counterpart, and co-operate to define a seal receiving channel;
the outermost surface of the exterior wall of the first frame member is disposed in contact engagement with the outermost surface of the exterior wall of the second frame member, and co-operate such that relative rotation, between the first frame member and the second frame member, about an axis of rotation that is parallel to a longitudinal axis of the first frame member, is opposed by the outermost surface of the exterior wall of the first frame member and the outermost surface of the exterior wall of the second frame member; and
while: (i) the seal is retained to the either one of: (a) the first frame member via the first seal retainer, and (b) the second frame member via the second seal retainer, and (ii) the exterior wall of the first frame member is disposed opposite to the exterior wall of the second frame member, such that the seal receiving channel is defined and the relative rotation, between the first frame member and the second frame member, about the axis of rotation, is opposed, by the outermost surface of the exterior wall of the first frame member and the outermost surface of the exterior wall of the second frame member, the seal is disposed in the seal receiving channel.

29. The window assembly of claim 28, wherein:
the seal-receiving channel first counterpart includes a recess, and the seal-receiving channel second counterpart includes a recess.

30. The window assembly of claim 28, wherein:
the retainability of the seal to the either one of: (a) the first frame member via the first seal retainer, and (b) the second frame member via the second seal retainer, is such that the seal is retainable to both of: (a) the first frame member via the first seal retainer, and (b) the second frame member via the second seal retainer; and
while: (i) the seal is retained to the both of: (a) the first frame member via the first seal retainer, and (b) the second frame member via the second seal retainer, and (ii) the exterior wall of the first frame member is disposed opposite to the exterior wall of the second frame member for assembling the window assembly such that the seal receiving channel is defined, the seal is disposed in the seal receiving channel.

31. The window assembly of claim 28, wherein:
the opposition of the relative rotation, between the first frame member and the second frame member, about the axis of rotation, by the outermost surface of the exterior wall of the first frame member and the outermost surface of the exterior wall of the second frame member, is a prevention of the relative rotation, between the first frame member and the second frame member, about the axis of rotation, by the outermost surface of the exterior wall of the first frame member and the outermost surface of the exterior wall of the second frame member.

32. The window assembly of claim 28, wherein:
the axis of rotation is parallel to a longitudinal axis of the second frame member.

33. The window assembly of claim 28, wherein:
the axis of rotation is disposed between the exterior wall of the first frame member and the exterior wall of the second frame member.

34. A window assembly, comprising:
a first frame member, including an exterior wall that defines a seal-receiving channel first counterpart that includes a first seal retainer and further defines an outermost surface, and a second frame member, including an exterior wall that defines a seal-receiving channel second counterpart that includes a second seal retainer and further defines an outermost surface;
the seal-receiving channel first counterpart of the first frame member is configured to be disposed in opposition to the seal-receiving channel second counterpart of the second frame member, with effect that:
a seal-receiving channel is defined, the seal-receiving channel configured for disposition of a seal therein; and
the outermost surface of the exterior wall of the first frame member is configured to be disposed in contact engagement with the outermost surface of the exterior wall of the second frame member, with effect that:
the outermost surface of the exterior wall of the first frame member and the outermost surface of the exterior wall of the second frame member co-operate such that relative rotation, between the first frame member and the second frame member, about an axis of rotation that is parallel to a longitudinal axis of the first frame member, is opposed by the outermost surface of the exterior wall of the first frame member and the outermost surface of the exterior wall of the second frame member;

wherein:

the first seal retainer of the first frame member is configured for interacting with the seal to effectuate retention of the seal to the first frame member, and the second seal retainer of the second frame member is configured for interacting with the seal to effectuate retention of the seal to the second frame member, such that the seal is retainable to either one of: (a) the first frame member via the first seal retainer, and (b) the second frame member via the second seal retainer; and while: (i) the seal is retained to the either one of: (a) the first frame member via the first seal retainer, and (b) the second frame member via the second seal retainer, and (ii) the one of the first frame member and the second frame member is disposed, relative to the other one of the first frame member and the second frame member, for assembling the window assembly, such that the seal-receiving channel first counterpart of the first frame member is disposed in opposition to the seal-receiving channel second counterpart of the second frame member such that the seal-receiving channel is defined, and the outermost surface of the exterior wall of the first frame member is disposed in contact engagement with the outermost surface of the exterior wall of the second frame member, such that the relative rotation, between the first frame member and the second frame member, about the axis of rotation, is opposed by the exterior wall of the first frame member and the exterior wall of the second frame member, the seal is disposed in the seal receiving channel.

35. The window assembly of claim 34, wherein:

the retainability of the seal to the either one of: (a) the first frame member via the first seal retainer, and (b) the second frame member via the second seal retainer, is such that the seal is retainable to both of: (a) the first frame member via the first seal retainer, and (b) the second frame member via the second seal retainer; and while: (i) the seal is retained to the both of: (a) the first frame member via the first seal retainer, and (b) the second frame member via the second seal retainer, and (ii) the exterior wall of the first frame member is disposed opposite to the exterior wall of the second frame member for assembling the window assembly such that the seal receiving channel is defined, the seal is disposed in the seal receiving channel.

36. The window assembly of claim 34, wherein:

the opposition of the relative rotation, between the first frame member and the second frame member, about the axis of rotation, by the outermost surface of the exterior wall of the first frame member and the outermost surface of the exterior wall of the second frame member, is a prevention of the relative rotation, between the first frame member and the second frame member, about the axis of rotation, by the outermost surface of the exterior wall of the first frame member and the outermost surface of the exterior wall of the second frame member.

37. The window assembly of claim 34, wherein:

the axis of rotation is parallel to a longitudinal axis of the second frame member.

38. The window assembly of claim 34, wherein:

the axis of rotation is disposed between the exterior wall of the first frame member and the exterior wall of the second frame member.

* * * * *